(12) United States Patent
Mohammadian et al.

(10) Patent No.: US 9,178,387 B2
(45) Date of Patent: Nov. 3, 2015

(54) RECEIVE ANTENNA FOR WIRELESS POWER TRANSFER

(75) Inventors: Alireza Hormoz Mohammadian, San Diego, CA (US); Sreenivas Kasturi, San Diego, CA (US); Miles Alexander Lyell Kirby, San Diego, CA (US); Ernest T. Ozaki, Poway, CA (US); Stanley Slavko Toncich, San Diego, CA (US); Allen Minh-Triet Tran, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 612 days.

(21) Appl. No.: 12/249,881

(22) Filed: Oct. 10, 2008

(65) Prior Publication Data

US 2009/0284227 A1   Nov. 19, 2009

Related U.S. Application Data

(60) Provisional application No. 61/053,000, filed on May 13, 2008, provisional application No. 61/053,004, filed on May 13, 2008, provisional application No. 61/053,008, filed on May 13, 2008, provisional (Continued)

(51) Int. Cl.
*H02J 7/00* (2006.01)
*H02J 17/00* (2006.01)
*G06K 7/00* (2006.01)
(Continued)

(52) U.S. Cl.
CPC .............. *H02J 17/00* (2013.01); *G06K 7/0008* (2013.01); *G06K 7/10178* (2013.01); *G06K 19/0701* (2013.01); *G06K 19/0715* (2013.01); *G06K 19/0723* (2013.01); *H01F 38/14* (2013.01); *H01Q 1/2225* (2013.01); *H01Q 1/38* (2013.01); *H01Q 7/00* (2013.01); *H02J 5/005* (2013.01);

(Continued)

(58) Field of Classification Search
USPC ..................... 320/108, 109, 139, 140; 310/50
See application file for complete search history.

(56) References Cited

U.S. PATENT DOCUMENTS 3,633,109 A   1/1972   Schulz
4,684,869 A   8/1987   Kobayashi et al.
(Continued)

FOREIGN PATENT DOCUMENTS

CN   1119774 A   4/1996
CN   1202754 A   12/1998
(Continued)

OTHER PUBLICATIONS

International Search Report and Written Opinion—PCT/US2009/043513—International Search Authority, European Patent Office, Apr. 7, 2010.

(Continued)

*Primary Examiner* — Yalkew Fantu
(74) *Attorney, Agent, or Firm* — Knobbe Martens Olson & Bear LLP

(57) ABSTRACT

Exemplary embodiments are directed to wireless power transfer to an electronic circuit including a wireless charging receive antenna comprising a first loop of an energy receiving conductor and at least another loop of said energy receiving conductor electrically coupled to the first loop. The loops form a multi-turn loop antenna to resonate at a wireless charging frequency and provide wirelessly received power to the electronic device. The multi-turn loop antenna is configured for affixing to a housing of the wireless device.

23 Claims, 12 Drawing Sheets

Related U.S. Application Data application No. 61/053,010, filed on May 13, 2008, provisional application No. 61/053,012, filed on May 13, 2008, provisional application No. 61/053,015, filed on May 13, 2008, provisional application No. 61/060,735, filed on Jun. 11, 2008, provisional application No. 61/060,738, filed on Jun. 11, 2008, provisional application No. 61/060,741, filed on Jun. 11, 2008, provisional application No. 61/081,332, filed on Jul. 16, 2008.

(51) Int. Cl.
| | | |
|---|---|---|
| G06K 7/10 | (2006.01) | |
| G06K 19/07 | (2006.01) | |
| H01Q 1/38 | (2006.01) | |
| H01Q 7/00 | (2006.01) | |
| H02J 5/00 | (2006.01) | |
| H02J 7/02 | (2006.01) | |
| H04B 5/00 | (2006.01) | |
| H04B 5/02 | (2006.01) | |
| H01Q 1/22 | (2006.01) | |
| H01F 38/14 | (2006.01) | |

(52) U.S. Cl.
CPC .............. *H02J 7/025* (2013.01); *H04B 5/0031* (2013.01); *H04B 5/0037* (2013.01); *H04B 5/02* (2013.01)

(56) References Cited

U.S. PATENT DOCUMENTS

| | | | |
|---|---|---|---|
| 4,802,080 A | 1/1989 | Bossi et al. | |
| 5,201,066 A | 4/1993 | Kim | |
| 5,287,112 A | 2/1994 | Schuermann | |
| 5,311,198 A | 5/1994 | Sutton | |
| 5,520,892 A | 5/1996 | Bowen | |
| 5,539,394 A | 7/1996 | Cato et al. | |
| 5,619,530 A | 4/1997 | Cadd et al. | |
| 5,790,080 A | 8/1998 | Apostolos | |
| 5,956,626 A | 9/1999 | Kaschke et al. | |
| 5,963,144 A | 10/1999 | Kruest | |
| 6,151,500 A | 11/2000 | Cardina et al. | |
| 6,195,562 B1 | 2/2001 | Pirhonen et al. | |
| 6,263,247 B1 | 7/2001 | Mueller et al. | |
| 6,344,828 B1 | 2/2002 | Grantz et al. | |
| 6,489,745 B1 | 12/2002 | Koreis | |
| 6,600,931 B2 | 7/2003 | Sutton et al. | |
| 6,608,550 B2 | 8/2003 | Hayashi et al. | |
| 6,664,770 B1 | 12/2003 | Bartels | |
| 6,683,438 B2 | 1/2004 | Park et al. | |
| 6,690,264 B2 | 2/2004 | Dalglish | |
| 6,760,578 B2 | 7/2004 | Rotzoll | |
| 6,809,498 B2 * | 10/2004 | Nakamura et al. | 320/108 |
| 6,839,035 B1 | 1/2005 | Addonisio et al. | |
| 6,853,629 B2 | 2/2005 | Alamouti et al. | |
| 6,906,495 B2 | 6/2005 | Cheng et al. | |
| 6,967,462 B1 | 11/2005 | Landis | |
| 6,970,142 B1 | 11/2005 | Pleva et al. | |
| 6,975,198 B2 | 12/2005 | Baarman et al. | |
| 7,069,086 B2 | 6/2006 | Von Arx | |
| 7,142,811 B2 | 11/2006 | Terranova et al. | |
| 7,146,139 B2 | 12/2006 | Nevermann | |
| 7,164,255 B2 * | 1/2007 | Hui | 320/108 |
| 7,193,578 B1 | 3/2007 | Harris et al. | |
| 7,239,110 B2 | 7/2007 | Cheng et al. | |
| 7,243,855 B2 | 7/2007 | Matsumoto et al. | |
| 7,248,841 B2 | 7/2007 | Agee et al. | |
| 7,356,588 B2 | 4/2008 | Stineman, Jr. et al. | |
| 7,375,492 B2 | 5/2008 | Calhoon et al. | |
| 7,378,817 B2 | 5/2008 | Calhoon et al. | |
| 7,382,260 B2 | 6/2008 | Agarwal et al. | |
| 7,382,636 B2 | 6/2008 | Baarman et al. | |
| 7,428,438 B2 | 9/2008 | Parramon et al. | |
| 7,443,057 B2 | 10/2008 | Nunally | |
| 7,478,108 B2 | 1/2009 | Townsend et al. | |
| 7,480,907 B1 | 1/2009 | Marolia et al. | |
| 7,499,722 B2 | 3/2009 | McDowell et al. | |
| 7,521,890 B2 | 4/2009 | Lee et al. | |
| 7,538,666 B2 | 5/2009 | Campman | |
| 7,539,465 B2 | 5/2009 | Quan | |
| 7,554,316 B2 | 6/2009 | Stevens et al. | |
| 7,561,050 B2 | 7/2009 | Bhogal et al. | |
| 7,565,108 B2 | 7/2009 | Kotola et al. | |
| 7,576,514 B2 | 8/2009 | Hui et al. | |
| 7,576,657 B2 | 8/2009 | Duron et al. | |
| 7,579,913 B1 | 8/2009 | Cheng et al. | |
| 7,598,704 B2 | 10/2009 | Taniguchi et al. | |
| 7,605,496 B2 | 10/2009 | Stevens et al. | |
| 7,609,157 B2 | 10/2009 | McFarland | |
| 7,626,544 B2 | 12/2009 | Smith et al. | |
| 7,629,886 B2 | 12/2009 | Steeves | |
| 7,642,918 B2 | 1/2010 | Kippelen et al. | |
| 7,646,343 B2 | 1/2010 | Shtrom et al. | |
| 7,663,490 B2 | 2/2010 | Dishongh | |
| 7,675,403 B2 | 3/2010 | Quan et al. | |
| 7,741,734 B2 | 6/2010 | Joannopoulos et al. | |
| 7,778,224 B2 | 8/2010 | Hayashi et al. | |
| 7,792,553 B2 | 9/2010 | Fukui et al. | |
| 7,793,121 B2 | 9/2010 | Lawther et al. | |
| 7,812,481 B2 | 10/2010 | Iisaka et al. | |
| 7,825,543 B2 | 11/2010 | Karalis et al. | |
| 7,831,757 B2 | 11/2010 | Habuto et al. | |
| 7,844,306 B2 | 11/2010 | Shearer et al. | |
| 7,868,837 B2 | 1/2011 | Yun et al. | |
| 7,952,322 B2 | 5/2011 | Partovi et al. | |
| 7,994,880 B2 | 8/2011 | Chen et al. | |
| 8,004,118 B2 | 8/2011 | Kamijo et al. | |
| 8,035,255 B2 | 10/2011 | Kurs et al. | |
| 8,073,387 B2 | 12/2011 | Maslennikov et al. | |
| 8,301,080 B2 | 10/2012 | Baarman | |
| 8,432,293 B2 | 4/2013 | Symons | |
| 2001/0000960 A1 | 5/2001 | Dettloff | |
| 2001/0046205 A1 | 11/2001 | Easton et al. | |
| 2002/0041624 A1 | 4/2002 | Kim et al. | |
| 2002/0154705 A1 | 10/2002 | Walton et al. | |
| 2002/0158512 A1 | 10/2002 | Mizutani et al. | |
| 2003/0048254 A1 | 3/2003 | Huang | |
| 2003/0078634 A1 | 4/2003 | Schulman et al. | |
| 2004/0002835 A1 | 1/2004 | Nelson | |
| 2004/0041669 A1 | 3/2004 | Kawai | |
| 2004/0116952 A1 | 6/2004 | Sakurai et al. | |
| 2004/0130425 A1 | 7/2004 | Dayan et al. | |
| 2004/0130915 A1 | 7/2004 | Baarman | |
| 2004/0130916 A1 | 7/2004 | Baarman | |
| 2004/0145342 A1 | 7/2004 | Lyon | |
| 2004/0154652 A1 | 8/2004 | Karapetyan | |
| 2004/0166869 A1 | 8/2004 | Laroia et al. | |
| 2004/0180637 A1 | 9/2004 | Nagai et al. | |
| 2004/0227057 A1 | 11/2004 | Tuominen et al. | |
| 2004/0245473 A1 | 12/2004 | Takayama et al. | |
| 2004/0248523 A1 | 12/2004 | Nishimura et al. | |
| 2005/0068009 A1 | 3/2005 | Aoki | |
| 2005/0068019 A1 | 3/2005 | Nakamura et al. | |
| 2005/0083881 A1 | 4/2005 | Ohwada | |
| 2005/0110641 A1 | 5/2005 | Mendolia et al. | |
| 2005/0116683 A1 | 6/2005 | Cheng et al. | |
| 2005/0151511 A1 | 7/2005 | Chary | |
| 2005/0156560 A1 | 7/2005 | Shimaoka et al. | |
| 2005/0205679 A1 | 9/2005 | Alihodzic | |
| 2005/0219132 A1 | 10/2005 | Charrat | |
| 2005/0220057 A1 | 10/2005 | Monsen | |
| 2005/0225437 A1 | 10/2005 | Shiotsu et al. | |
| 2005/0239018 A1 | 10/2005 | Green et al. | |
| 2005/0242183 A1 | 11/2005 | Bremer | |
| 2006/0084392 A1 | 4/2006 | Marholev et al. | |
| 2006/0114102 A1 | 6/2006 | Chang et al. | |
| 2006/0131193 A1 | 6/2006 | Sherman | |
| 2006/0184705 A1 | 8/2006 | Nakajima | |
| 2006/0197652 A1 | 9/2006 | Hild et al. | |
| 2006/0202665 A1 | 9/2006 | Hsu | |
| 2006/0220863 A1 | 10/2006 | Koyama | |
| 2006/0238365 A1 | 10/2006 | Vecchione et al. | |

(56) References Cited

U.S. PATENT DOCUMENTS

| | | |
|---|---|---|
| 2006/0244568 A1 | 11/2006 | Tong et al. |
| 2007/0001816 A1 | 1/2007 | Lindley et al. |
| 2007/0004456 A1 | 1/2007 | Shimada |
| 2007/0004466 A1 | 1/2007 | Haartsen et al. |
| 2007/0017804 A1 | 1/2007 | Myrtveit et al. |
| 2007/0021140 A1 | 1/2007 | Keyes, IV et al. |
| 2007/0026799 A1 | 2/2007 | Wang et al. |
| 2007/0029965 A1 | 2/2007 | Hui et al. |
| 2007/0072474 A1 | 3/2007 | Beasley et al. |
| 2007/0080804 A1 | 4/2007 | Hirahara et al. |
| 2007/0091006 A1 | 4/2007 | Thober et al. |
| 2007/0109708 A1 | 5/2007 | Hussman et al. |
| 2007/0158438 A1 | 7/2007 | Fukuda et al. |
| 2007/0165475 A1 | 7/2007 | Choi et al. |
| 2007/0171811 A1 | 7/2007 | Lee et al. |
| 2007/0182367 A1 | 8/2007 | Partovi |
| 2007/0222681 A1 | 9/2007 | Greene et al. |
| 2007/0279002 A1 | 12/2007 | Partovi |
| 2007/0287508 A1 | 12/2007 | Telefus |
| 2007/0290654 A1 | 12/2007 | Govari et al. |
| 2007/0296393 A1 | 12/2007 | Malpas et al. |
| 2008/0014897 A1 | 1/2008 | Cook et al. |
| 2008/0030324 A1 | 2/2008 | Bekritsky et al. |
| 2008/0049372 A1 | 2/2008 | Loke |
| 2008/0054638 A1 | 3/2008 | Greene et al. |
| 2008/0058029 A1 | 3/2008 | Sato et al. |
| 2008/0066979 A1 | 3/2008 | Carter |
| 2008/0067874 A1 | 3/2008 | Tseng |
| 2008/0079396 A1 | 4/2008 | Yamazaki et al. |
| 2008/0091350 A1 | 4/2008 | Smith et al. |
| 2008/0114255 A1 | 5/2008 | Schwartz et al. |
| 2008/0116847 A1 | 5/2008 | Loke et al. |
| 2008/0122297 A1 | 5/2008 | Arai |
| 2008/0157711 A1 | 7/2008 | Chiang et al. |
| 2008/0165074 A1 | 7/2008 | Terry |
| 2008/0174266 A1 | 7/2008 | Tamura |
| 2008/0174267 A1 | 7/2008 | Onishi et al. |
| 2008/0203815 A1 | 8/2008 | Ozawa et al. |
| 2008/0211320 A1 | 9/2008 | Cook et al. |
| 2008/0242337 A1 | 10/2008 | Sampath et al. |
| 2008/0252254 A1 | 10/2008 | Osada |
| 2008/0258679 A1 | 10/2008 | Manico et al. |
| 2008/0261519 A1 | 10/2008 | DeMarco et al. |
| 2008/0266748 A1 | 10/2008 | Lee |
| 2008/0315826 A1 | 12/2008 | Alberth, Jr. et al. |
| 2009/0015075 A1 | 1/2009 | Cook et al. |
| 2009/0021374 A1 | 1/2009 | Stagg |
| 2009/0031069 A1 | 1/2009 | Habuto et al. |
| 2009/0045772 A1* | 2/2009 | Cook et al. ............ 320/108 |
| 2009/0058189 A1 | 3/2009 | Cook et al. |
| 2009/0058361 A1 | 3/2009 | John |
| 2009/0061784 A1 | 3/2009 | Cordeiro |
| 2009/0072629 A1 | 3/2009 | Cook et al. |
| 2009/0072782 A1 | 3/2009 | Randall |
| 2009/0075704 A1 | 3/2009 | Wang |
| 2009/0096413 A1 | 4/2009 | Partovi et al. |
| 2009/0102292 A1 | 4/2009 | Cook et al. |
| 2009/0127937 A1 | 5/2009 | Widmer et al. |
| 2009/0134712 A1 | 5/2009 | Cook et al. |
| 2009/0174258 A1 | 7/2009 | Liu et al. |
| 2009/0212636 A1 | 8/2009 | Cook et al. |
| 2009/0224609 A1 | 9/2009 | Cook et al. |
| 2009/0243397 A1 | 10/2009 | Cook et al. |
| 2009/0284082 A1 | 11/2009 | Mohammadian |
| 2009/0284218 A1 | 11/2009 | Mohammadian et al. |
| 2009/0284220 A1 | 11/2009 | Toncich et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2010/0023092 A1 | 1/2010 | Govari et al. |
| 2010/0033021 A1 | 2/2010 | Bennett |
| 2010/0038970 A1 | 2/2010 | Cook et al. |
| 2010/0039066 A1 | 2/2010 | Yuan et al. |
| 2010/0081378 A1 | 4/2010 | Kawamura |
| 2010/0148939 A1 | 6/2010 | Yamada et al. |
| 2010/0181841 A1 | 7/2010 | Azancot et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201310 A1 | 8/2010 | Vorenkamp et al. |
| 2010/0201311 A1 | 8/2010 | Lyell Kirby et al. |
| 2010/0201312 A1 | 8/2010 | Kirby et al. |
| 2010/0201533 A1 | 8/2010 | Kirby et al. |
| 2010/0213896 A1 | 8/2010 | Ishii et al. |
| 2010/0219693 A1 | 9/2010 | Azancot et al. |
| 2010/0289341 A1 | 11/2010 | Ozaki et al. |
| 2010/0323642 A1 | 12/2010 | Morita |
| 2010/0328044 A1 | 12/2010 | Waffenschmidt et al. |
| 2011/0057606 A1 | 3/2011 | Saunamaki |
| 2011/0074347 A1 | 3/2011 | Karalis et al. |
| 2011/0133569 A1 | 6/2011 | Cheon et al. |
| 2011/0176251 A1 | 7/2011 | Lee |
| 2012/0007437 A1 | 1/2012 | Fells et al. |
| 2013/0147428 A1 | 6/2013 | Kirby et al. |
| 2013/0147429 A1 | 6/2013 | Kirby et al. |
| 2013/0300358 A1 | 11/2013 | Kirby et al. |
| 2014/0103881 A1 | 4/2014 | Mohammadian et al. |
| 2015/0171636 A1 | 6/2015 | Toncich |

FOREIGN PATENT DOCUMENTS

| | | |
|---|---|---|
| CN | 1242092 A | 1/2000 |
| CN | 1426170 A | 6/2003 |
| CN | 1460226 A | 12/2003 |
| CN | 2681368 Y | 2/2005 |
| CN | 1604426 A | 4/2005 |
| CN | 1717879 A | 1/2006 |
| CN | 1722521 A | 1/2006 |
| CN | 1723643 A | 1/2006 |
| CN | 1726656 A | 1/2006 |
| CN | 1768462 A | 5/2006 |
| CN | 1768467 A | 5/2006 |
| CN | 1808473 A | 7/2006 |
| CN | 1829037 A | 9/2006 |
| CN | 1836953 A | 9/2006 |
| CN | 1881733 A | 12/2006 |
| CN | 1906863 A | 1/2007 |
| CN | 1912786 A | 2/2007 |
| CN | 1941541 A | 4/2007 |
| CN | 1965324 A | 5/2007 |
| CN | 1977294 A | 6/2007 |
| CN | 1996352 A | 7/2007 |
| CN | 101023600 A | 8/2007 |
| CN | 101123318 A | 2/2008 |
| CN | 101136561 A | 3/2008 |
| CN | 101154823 A | 4/2008 |
| CN | 201044047 Y | 4/2008 |
| CN | 101233666 A | 7/2008 |
| CN | 101291268 A | 10/2008 |
| DE | 4004196 | 4/1991 |
| DE | 29710675 U1 | 8/1997 |
| DE | 10104019 | 1/2002 |
| EP | 0444416 A1 | 9/1991 |
| EP | 0689149 | 12/1995 |
| EP | 0831411 | 3/1998 |
| EP | 0878891 A2 | 11/1998 |
| EP | 0962407 A1 | 12/1999 |
| EP | 0977304 A1 | 2/2000 |
| EP | 1022677 | 7/2000 |
| EP | 1050839 | 11/2000 |
| EP | 1298578 A1 | 4/2003 |
| EP | 1420357 A1 | 5/2004 |
| EP | 1454769 A1 | 9/2004 |
| EP | 1502543 A1 | 2/2005 |
| EP | 1538726 A1 | 6/2005 |
| EP | 1575184 A1 | 9/2005 |
| EP | 1585268 A2 | 10/2005 |
| EP | 1602160 A1 | 12/2005 |
| EP | 1703435 | 9/2006 |
| EP | 1713145 | 10/2006 |
| EP | 1914663 A1 | 4/2008 |
| EP | 1919091 | 5/2008 |

(56) References Cited

FOREIGN PATENT DOCUMENTS

| | | |
|---|---|---|
| EP | 2093860 A1 | 8/2009 |
| GB | 2307379 | 5/1997 |
| GB | 2380359 | 4/2003 |
| GB | 2394843 A | 5/2004 |
| GB | 2395627 | 5/2004 |
| GB | 2416633 | 2/2006 |
| GB | 2433178 | 6/2007 |
| GB | 2440571 A | 2/2008 |
| JP | 59031054 U | 2/1984 |
| JP | S62203526 A | 9/1987 |
| JP | H05291991 A | 11/1993 |
| JP | 6112720 A | 4/1994 |
| JP | H06133476 A | 5/1994 |
| JP | H0711035 U | 2/1995 |
| JP | H0739077 A | 2/1995 |
| JP | H0771769 A | 3/1995 |
| JP | H07131376 A | 5/1995 |
| JP | 9103037 A | 4/1997 |
| JP | 9147070 A | 6/1997 |
| JP | H09172743 A | 6/1997 |
| JP | 10145987 A | 5/1998 |
| JP | H10210751 A | 8/1998 |
| JP | H10225020 A | 8/1998 |
| JP | 10240880 A | 9/1998 |
| JP | 10295043 A | 11/1998 |
| JP | H10293826 A | 11/1998 |
| JP | 11025238 A | 1/1999 |
| JP | 11069640 | 3/1999 |
| JP | 11098706 | 4/1999 |
| JP | 11122832 | 4/1999 |
| JP | H11134566 A | 5/1999 |
| JP | H11155245 A | 6/1999 |
| JP | 11188113 A | 7/1999 |
| JP | 11338983 A | 12/1999 |
| JP | H11341711 A | 12/1999 |
| JP | 2000037046 A | 2/2000 |
| JP | 2000050534 A | 2/2000 |
| JP | 2000057450 A | 2/2000 |
| JP | 2000501263 A | 2/2000 |
| JP | 2000067195 A | 3/2000 |
| JP | 2000076008 A | 3/2000 |
| JP | 2000113127 A | 4/2000 |
| JP | 2000138621 A | 5/2000 |
| JP | 2000172795 A | 6/2000 |
| JP | 2001238372 A | 8/2001 |
| JP | 2001511574 A | 8/2001 |
| JP | 2001291080 A | 10/2001 |
| JP | 2001309579 A | 11/2001 |
| JP | 2001339327 A | 12/2001 |
| JP | 2002034169 A | 1/2002 |
| JP | 2002506259 A | 2/2002 |
| JP | 2002513490 A | 5/2002 |
| JP | 2002529982 A | 9/2002 |
| JP | 2003011734 A | 1/2003 |
| JP | 2003047178 A | 2/2003 |
| JP | 2003224937 A | 8/2003 |
| JP | 2004007851 A | 1/2004 |
| JP | 2004096589 A | 3/2004 |
| JP | 2004135455 A | 4/2004 |
| JP | 2004159456 A | 6/2004 |
| JP | 2004166384 A | 6/2004 |
| JP | 2004526236 A | 8/2004 |
| JP | 2004274972 A | 9/2004 |
| JP | 2004297779 A | 10/2004 |
| JP | 2004306558 A | 11/2004 |
| JP | 2004336742 A | 11/2004 |
| JP | 2004355212 A | 12/2004 |
| JP | 2005110399 A | 4/2005 |
| JP | 2005110412 A | 4/2005 |
| JP | 2005135455 A | 5/2005 |
| JP | 2005159607 A | 6/2005 |
| JP | 2005204493 A | 7/2005 |
| JP | 2005520428 A | 7/2005 |
| JP | 2005208754 A | 8/2005 |
| JP | 2005224045 A | 8/2005 |
| JP | 2005525705 A | 8/2005 |
| JP | 2005261187 A | 9/2005 |
| JP | 2005267643 A | 9/2005 |
| JP | 2005303697 A | 10/2005 |
| JP | 2006060909 A | 3/2006 |
| JP | 2006081249 A | 3/2006 |
| JP | 2006510101 A | 3/2006 |
| JP | 2006141170 A | 6/2006 |
| JP | 2006149168 A | 6/2006 |
| JP | 2006174676 A | 6/2006 |
| JP | 2006517378 A | 7/2006 |
| JP | 2006217731 A | 8/2006 |
| JP | 2006230129 A | 8/2006 |
| JP | 2006238548 A | 9/2006 |
| JP | 2006254678 A | 9/2006 |
| JP | 2006295905 A | 10/2006 |
| JP | 2006296123 A | 10/2006 |
| JP | 2006314181 A | 11/2006 |
| JP | 2007006029 A | 1/2007 |
| JP | 2007043773 A | 2/2007 |
| JP | 2007089341 A | 4/2007 |
| JP | 2007104868 A | 4/2007 |
| JP | 2007109301 A | 4/2007 |
| JP | 2007514400 A | 5/2007 |
| JP | 2007166379 A | 6/2007 |
| JP | 2007221584 A | 8/2007 |
| JP | 3995724 B2 | 10/2007 |
| JP | 2007336717 A | 12/2007 |
| JP | 2007537688 A | 12/2007 |
| JP | 2008054424 A | 3/2008 |
| JP | 2008508842 A | 3/2008 |
| JP | 2008104295 A | 5/2008 |
| JP | 2008109646 A | 5/2008 |
| JP | 2008120357 A | 5/2008 |
| JP | 2008199857 A | 8/2008 |
| JP | 2008199882 A | 8/2008 |
| JP | 2008283789 A | 11/2008 |
| JP | 2008543255 A | 11/2008 |
| JP | 2008295191 A | 12/2008 |
| JP | 2009523402 A | 6/2009 |
| JP | 2009527147 A | 7/2009 |
| JP | 2010508007 A | 3/2010 |
| JP | 2010508008 A | 3/2010 |
| JP | 2010527226 A | 8/2010 |
| JP | 2011030418 A | 2/2011 |
| KR | 1019980024391 | 7/1998 |
| KR | 20000011967 A | 2/2000 |
| KR | 20040026318 A | 3/2004 |
| KR | 20040072581 A | 8/2004 |
| KR | 20050044538 A | 5/2005 |
| KR | 20050105200 A | 11/2005 |
| KR | 20070017804 A | 2/2007 |
| KR | 20070032271 A | 3/2007 |
| KR | 20080036702 A | 4/2008 |
| KR | 20110009229 A | 1/2011 |
| TW | 546960 B | 8/2003 |
| TW | 200306048 A | 11/2003 |
| TW | 200512964 | 4/2005 |
| TW | 200614626 | 5/2006 |
| TW | M294779 U | 7/2006 |
| TW | 200717963 A | 5/2007 |
| TW | M317367 U | 8/2007 |
| TW | 200820537 A | 5/2008 |
| TW | 200824215 A | 6/2008 |
| TW | M334559 U | 6/2008 |
| TW | 200830663 A | 7/2008 |
| TW | M336621 U | 7/2008 |
| TW | 200843282 A | 11/2008 |
| TW | 200901597 A | 1/2009 |
| TW | M349639 U | 1/2009 |
| TW | I347724 | 8/2011 |
| TW | I366320 | 6/2012 |
| WO | WO9829969 | 7/1998 |
| WO | WO9854912 | 12/1998 |
| WO | WO9905658 A1 | 2/1999 |
| WO | WO0027137 A1 | 5/2000 |
| WO | WO0227682 | 4/2002 |
| WO | WO-02062077 A1 | 8/2002 |
| WO | WO03079524 A2 | 9/2003 |

(56) References Cited

FOREIGN PATENT DOCUMENTS

| | | |
|---|---|---|
| WO | WO-2004025805 A1 | 3/2004 |
| WO | WO2004032349 | 4/2004 |
| WO | WO2004055654 A2 | 7/2004 |
| WO | 2004068726 A2 | 8/2004 |
| WO | WO2004073150 A1 | 8/2004 |
| WO | WO2004073166 A2 | 8/2004 |
| WO | 2004096023 A1 | 11/2004 |
| WO | WO2005104022 | 11/2005 |
| WO | WO2006011769 A1 | 2/2006 |
| WO | WO-2006031133 A1 | 3/2006 |
| WO | 2006068416 A1 | 6/2006 |
| WO | WO-2006101285 A1 | 9/2006 |
| WO | WO-2006127624 A2 | 11/2006 |
| WO | WO-2007000055 A1 | 1/2007 |
| WO | WO-2007015599 | 2/2007 |
| WO | WO2007044144 | 4/2007 |
| WO | WO-2007068974 A2 | 6/2007 |
| WO | 2007081971 A2 | 7/2007 |
| WO | WO-2007089086 A1 | 8/2007 |
| WO | WO-2007095267 A2 | 8/2007 |
| WO | WO2007138690 A1 | 12/2007 |
| WO | 2008011769 A1 | 1/2008 |
| WO | 2008050292 A2 | 5/2008 |
| WO | WO2008050260 A1 | 5/2008 |
| WO | WO-2008072628 A1 | 6/2008 |
| WO | WO-2008109489 A2 | 9/2008 |
| WO | WO-2008109691 A2 | 9/2008 |
| WO | WO-2009140221 | 11/2009 |
| WO | WO2009140223 | 11/2009 |

OTHER PUBLICATIONS

Taiwan Search Report—TW098115923—TIPO—Apr. 15, 2013.

Nikitin P.V., et al., "Theory and Measurement of Backscattering from RFID Tags", Antennas and Propagation Magazine, Dec. 2006, pp. 8. URL: http://www.ee.washington.edu/people/faculty/nikitin_pavel/papers/APmag_2006.pdf.

Turner C., et al., "Backscatter modulation of Impedance Modulated RFID tags", Feb. 2003, pp. 5. URL: http://www.rfip.eu/downloads/backscatter_tag_link_budget_and_modulation_at_reader_receiver.pdf.

Fan Z., et al., "Bandwidth allocation in UWB WPANs with ECMA-368 MAC", Computer Communications, Elsevier Science Publishers BV, Amsterdam, NL, vol. 32, No. 5, Mar. 27, 2009, pp. 954-960, XP026001994.

Yates et al., "Optimal transmission frequency for ultralow-power short-range radio links", Source: IEEE Transactions on Circuits and Systems I: Fundamental Theory and Applications,, vol. 51, No. 7, Jul. 2004, pp. 1405-1413.

Want R: "The Magic of RFID"QUEUE, vol. 2, No. 7, Oct. 2004, pp. 41-48, XP002585314Internet ISSN: 1542-7730 DOI: http://doi.acm.org/10.1145/1035594.1035619.

Want R: "An introduction to RFID technology" IEEE Pervasive Computing, IEEE Service Center, Los Alamitos, CA, US LNKD-DOI:10.1109/MPRV.2006.2. vol. 5, No. 1, Jan. 1, 2006, pp. 25-33, XP002510139ISSN: 1536-1268.

\* cited by examiner

RECEIVE ANTENNA FOR WIRELESS POWER TRANSFER

CLAIM OF PRIORITY UNDER 35 U.S.C. §119

This application claims priority under 35 U.S.C. §119(e) to:

U.S. Provisional Patent Application 61/060,735 entitled "REVERSE LINK SIGNALING VIA RECEIVE ANTENNA IMPEDANCE MODULATION" filed on Jun. 11, 2008;

U.S. Provisional Patent Application 61/060,738 entitled "SIGNALING CHARGING IN WIRELESS POWER ENVIRONMENT" filed on Jun. 11, 2008;

U.S. Provisional Patent Application 61/053,008 entitled "ADAPTIVE TUNING MECHANISM FOR WIRELESS POWER TRANSFER" filed on May 13, 2008;

U.S. Provisional Patent Application 61/053,010 entitled "EFFICIENT POWER MANAGEMENT SCHEME FOR WIRELESS POWER CHARGING SYSTEMS" filed on May 13, 2008;

U.S. Provisional Patent Application 61/060,741 entitled "TRANSMIT POWER CONTROL FOR A WIRELESS CHARGING SYSTEM" filed on Jun. 11, 2008;

U.S. Provisional Patent Application 61/053,000 entitled "REPEATERS FOR ENHANCEMENT OF WIRELESS POWER TRANSFER" filed on May 13, 2008;

U.S. Provisional Patent Application 61/053,004 entitled "WIRELESS POWER TRANSFER FOR APPLIANCES AND EQUIPMENTS" filed on May 13, 2008;

U.S. Provisional Patent Application 61/081,332 entitled "WIRELESS POWER TRANSFER USING NEGATIVE RESISTANCE" filed on Jul. 16, 2008;

U.S. Provisional Patent Application 61/053,012 entitled "EMBEDDED RECEIVE ANTENNA FOR WIRELESS POWER TRANSFER" filed on May 13, 2008; and U.S. Provisional Patent Application 61/053,015 entitled "PLANAR LARGE AREA WIRELESS CHARGING SYSTEM" filed on May 13, 2008.

REFERENCE TO CO-PENDING APPLICATIONS FOR PATENT

This application is also related to the following applications, which are assigned to the assignee hereof and filed on even date herewith, the disclosures of which are incorporated herein in their entirety by reference.

U.S. patent application Ser. No. 12/249,866 entitled "SIGNALING CHARGING IN WIRELESS POWER ENVIRONMENT."

U.S. patent application Ser. No. 12/249,861 entitled "TRANSMIT POWER CONTROL FOR A WIRELESS CHARGING SYSTEM."

U.S. patent application Ser. No. 12/249,873 entitled "REVERSE LINK SIGNALING VIA RECEIVE ANTENNA IMPEDANCE MODULATION."

U.S. patent application Ser. No. 12/249,875 entitled "WIRELESS POWER TRANSFER USING MULTIPLE TRANSMIT ANTENNAS," orignally filed as "METHOD AND APPARATUS FOR AN ENLARGED WIRELESS CHARGING AREA."

BACKGROUND

Approaches to the wireless power transfer field include use of induction such as an inductive charging pad, where an induction coupling takes place between the pad and the device to be charged. This approach, however, does not effectively reduce the need for the wires that transfer the power except for the last couple of inches between the recipient of power (receive site) and the patch that is hardwired to the power sources (outlet).

Another approach for wireless power transfer recommends using the power transmitted to the far field of a transmit antenna. However, the efficiency of this approach is very low since transmitted power decays proportional to the square of the distance from the transmit antenna to the receive site.

Another approach for wireless power transfer uses a generated near-field in transferring electric power from one resonant antenna to another in a system of two closely coupled antennas. This approach, however, requires antennas too large to fit into most portable devices in the receiving end of the power transfer system such as a laptop, a PDA, or a wireless handset. For example, in one wireless power transfer experiment between a transmit antenna and a receive antenna similarly shaped with a radius of 300 mm and a height of 200 mm and about 2 meters apart, the energy transfer efficiency was around 40 percent. The efficiency is further reduced when one of the antennas is substantially smaller than the other. The efficiency due to such size mismatch results in a decrease in energy transfer efficiency significantly below 10 percent.

Furthermore, location of the receive antenna over an electrically shielded or ferrite-based region also results in reduced efficiencies. Specifically, ferrite materials are lossy materials resulting in lower efficiencies for wireless power transfer. Accordingly, there is a need for a receive antenna and devices attached thereto that extend the efficiency of power transfer to a smaller dimensioned receive antenna.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
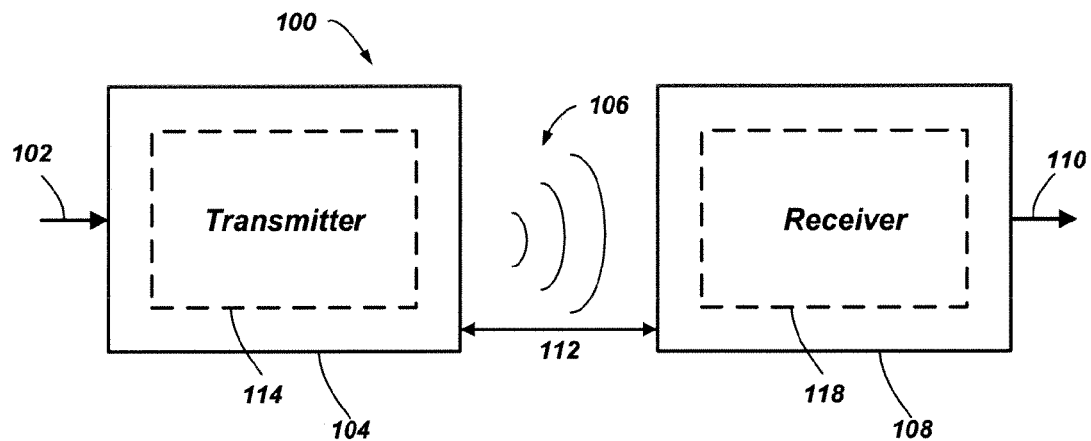
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
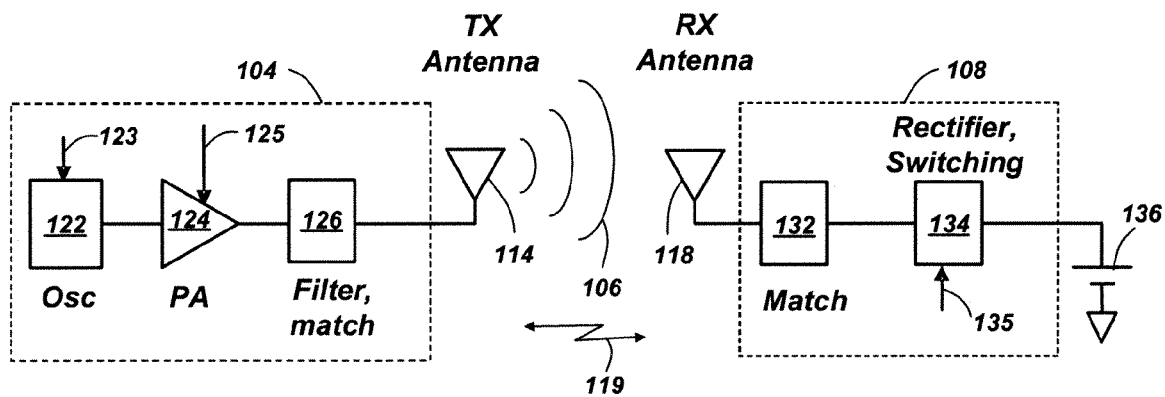
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
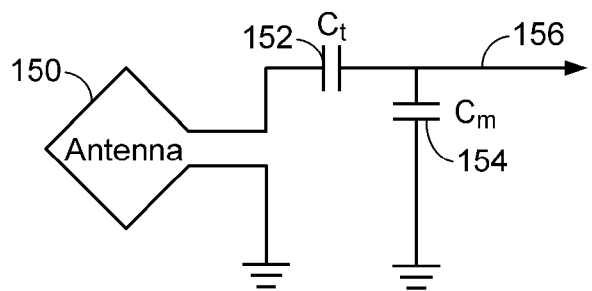
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156.

Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
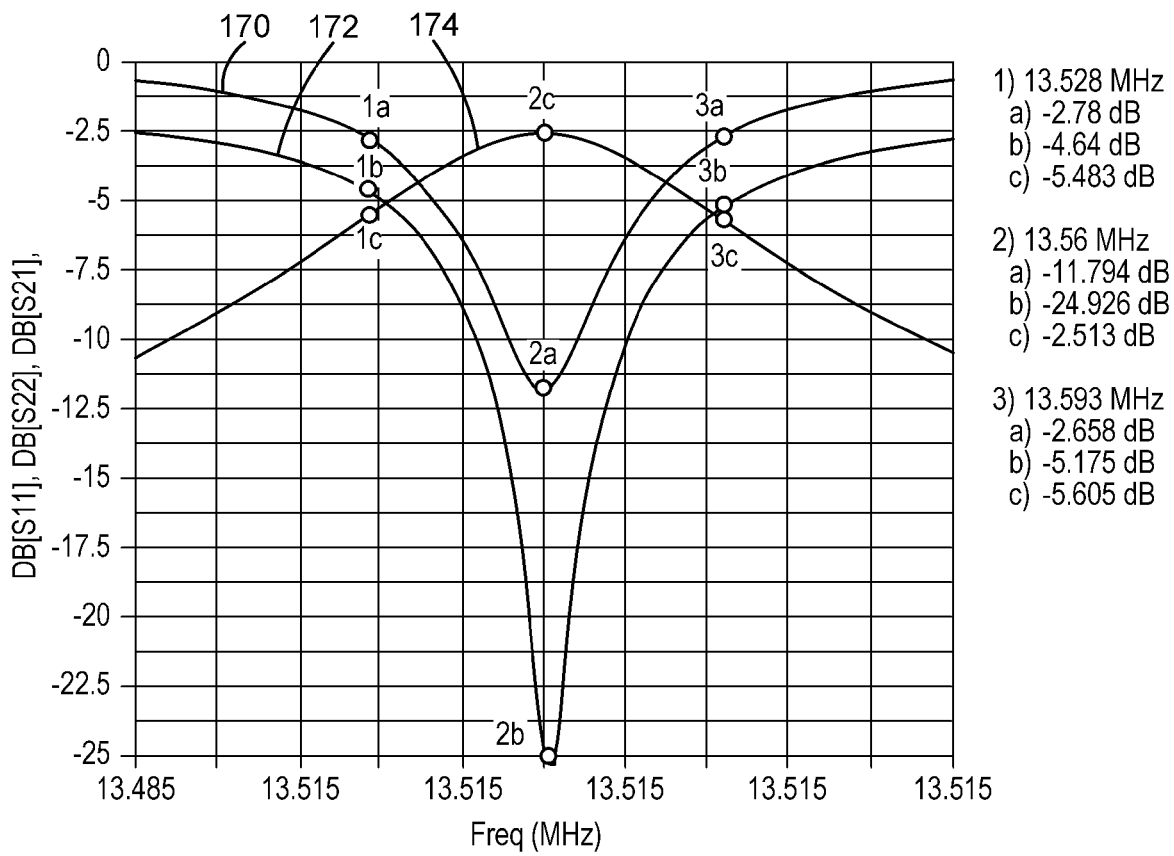
FIG. 4 shows simulation results indicating coupling strength between transmit and receive antennas.

FIG. 4 shows simulation results indicating coupling strength between transmit and receive antennas. Curves 170 and 172 indicate a measure of acceptance of power by the transmit and receive antennas, respectively. In other words, with a large negative number there is a very close impedance match and most of the power is accepted and, as a result, radiated by the transmit antenna. Conversely, a small negative number indicates that much of the power is reflected back from the antenna because there is not a close impedance match at the given frequency. In FIG. 4, the transmit antenna and the receive antenna are tuned to have a resonant frequency of about 13.56 MHz.

Curve 170 illustrates the amount of power transmitted from the transmit antenna at various frequencies. Thus, at points 1a and 3a, corresponding to about 13.528 MHz and 13.593 MHz, much of the power is reflected and not transmitted out of the transmit antenna. However, at point 2a, corresponding to about 13.56 MHz, it can be seen that a large amount of the power is accepted and transmitted out of the antenna.

Similarly, curve 172 illustrates the amount of power received by the receive antenna at various frequencies. Thus, at points 1b and 3b, corresponding to about 13.528 MHz and 13.593 MHz, much of the power is reflected and not conveyed through the receive antenna and into the receiver. However, at point 2b corresponding to about 13.56 MHz, it can be seen that a large amount of the power is accepted by the receive antenna and conveyed into the receiver.

Curve 174 indicates the amount of power received at the receiver after being sent from the transmitter through the transmit antenna, received through the receive antenna and conveyed to the receiver. Thus, at points 1c and 3c, corresponding to about 13.528 MHz and 13.593 MHz, much of the power sent out of the transmitter is not available at the receiver because (1) the transmit antenna rejects much of the power sent to it from the transmitter and (2) the coupling between the transmit antenna and the receive antenna is less efficient as the frequencies move away from the resonant frequency. However, at point 2c corresponding to about 13.56 MHz, it can be seen that a large amount of the power sent from the transmitter is available at the receiver, indicating a high degree of coupling between the transmit antenna and the receive antenna.

Figure 5A:
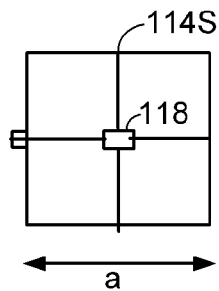
FIGS. 5A and 5B show layouts of loop antennas for transmit and receive antennas according to exemplary embodiments of the present invention.
Figure 5B:
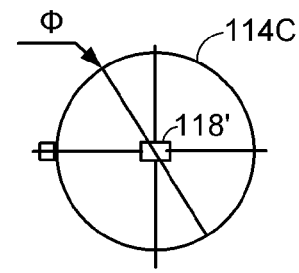

FIGS. 5A and 5B show layouts of loop antennas for transmit and receive antennas according to exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 5A illustrates a large square loop transmit antenna 114S and a small square loop receive antenna 118 placed in the same plane as the transmit antenna 114S and near the center of the transmit antenna 114S. FIG. 5B illustrates a large circular loop transmit antenna 114C and a small square loop receive antenna 118' placed in the same plane as the transmit antenna 114C and near the center of the transmit antenna 114C. The square loop transmit antenna 114S has side lengths of "a" while the circular loop transmit antenna 114C has a diameter of "(Φ)." For a square loop, it can be shown that there is an equivalent circular loop whose diameter may be defined as: $\Phi_{eq}=4a/\pi$.

Figure 6:
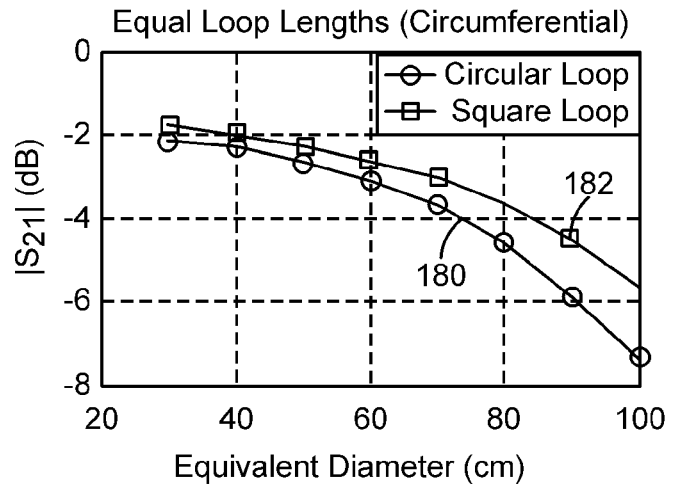
FIG. 6 shows simulation results indicating coupling strength between transmit and receive antennas relative to various circumference sizes for the square and circular transmit antennas illustrated in FIGS. 4A and 4B.

FIG. 6 shows simulation results indicating coupling strength between transmit and receive antennas relative to various circumferences for the square and circular transmit antennas illustrated in FIGS. 4A and 4B. Thus, curve 180 shows coupling strength between the circular loop transmit antennas 114C and the receive antenna 118 at various circumference sizes for the circular loop transmit antenna 114C. Similarly, curve 182 shows coupling strength between the square loop transmit antennas 114S and the receive antenna 118' at various equivalent circumference sizes for the transmit loop transmit antenna 114S.

Figure 7:
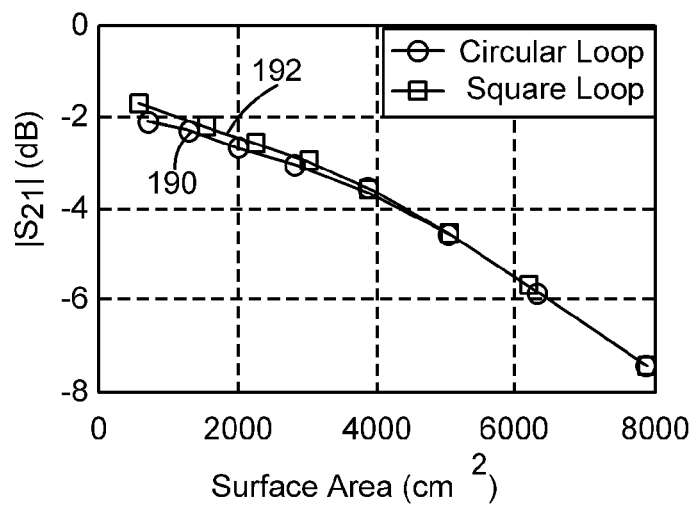
FIG. 7 shows simulation results indicating coupling strength between transmit and receive antennas relative to various surface areas for the square and circular transmit antennas illustrated in FIGS. 4A and 4B.

FIG. 7 shows simulation results indicating coupling strength between transmit and receive antennas relative to various surface areas for the square and circular transmit antennas illustrated in FIGS. 5A and 5B. Thus, curve 190 shows coupling strength between the circular loop transmit antennas 114C and the receive antenna 118 at various surface areas for the circular loop transmit antenna 114C. Similarly, curve 192 shows coupling strength between the square loop transmit antennas 114S and the receive antenna 118' at various surface areas for the transmit loop transmit antenna 114S.

Figure 8:
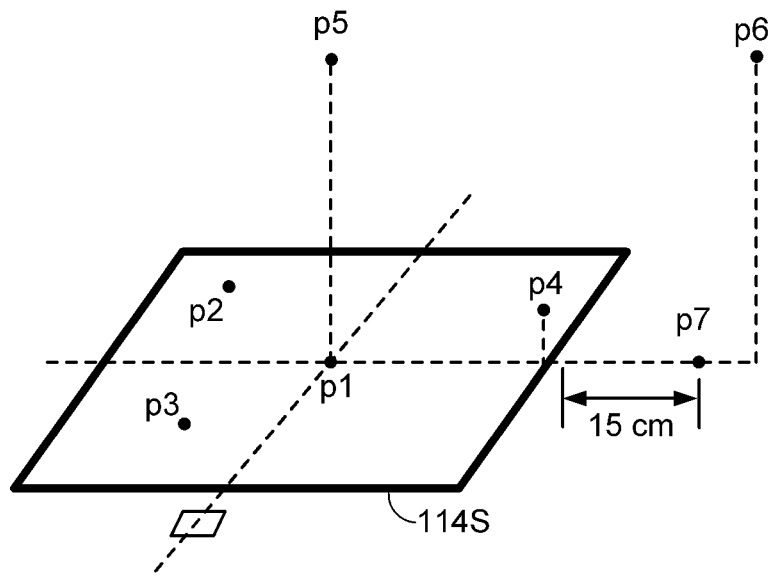
FIG. 8 shows various placement points for a receive antenna relative to a transmit antenna to illustrate coupling strengths in coplanar and coaxial placements.

FIG. 8 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 8.

TABLE 1

| Position | Distance from plane (cm) | S21 efficiency (%) | Efficiency (TX DC power in to RX DC power out) |
|---|---|---|---|
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 9:
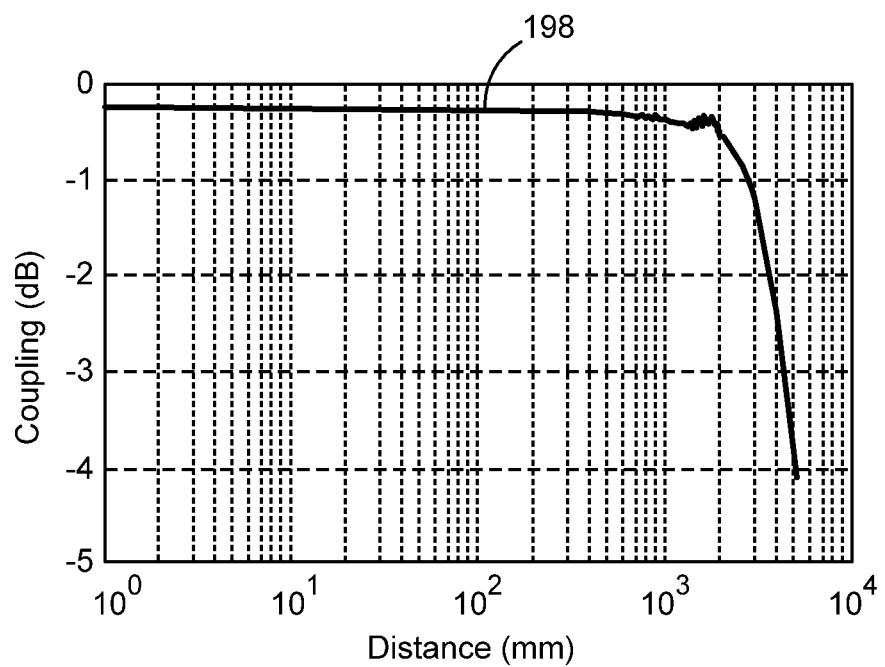
FIG. 9 shows simulation results indicating coupling strength for coaxial placement at various distances between the transmit and receive antennas.

FIG. 9 shows simulation results indicating coupling strength for coaxial placement at various distances between the transmit and receive antennas. The simulations for FIG. 9 are for square transmit and receive antennas in a coaxial placement, both with sides of about 1.2 meters and at a transmit frequency of 10 MHz. It can be seen that the coupling strength remains quite high and uniform at distances of less than about 0.5 meters.

Figure 10:
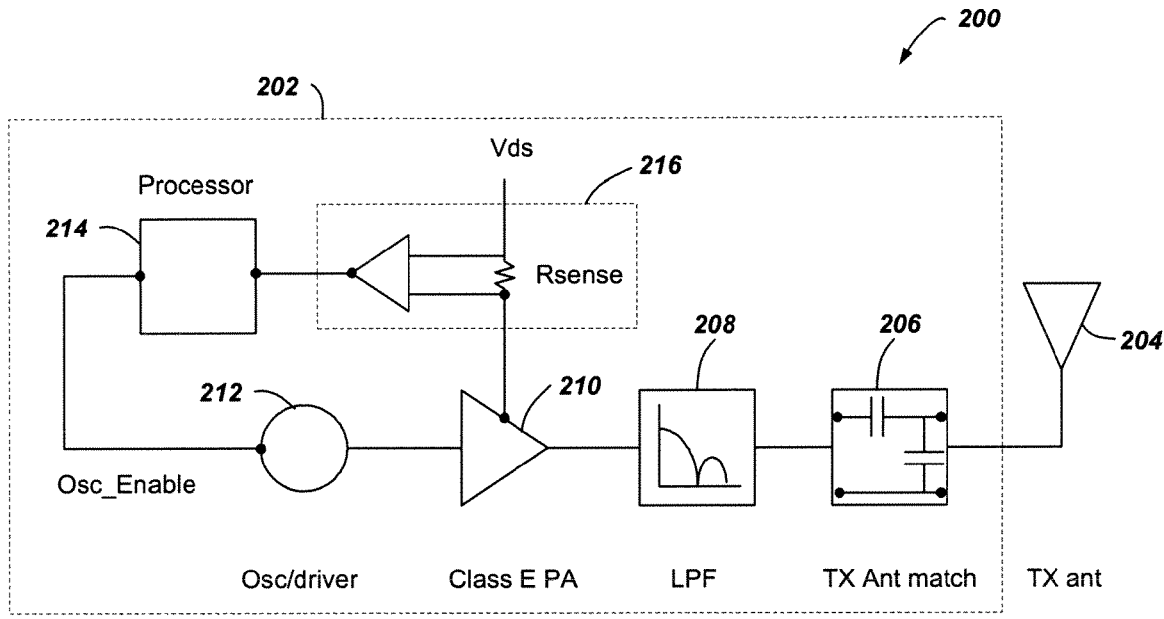
FIG. 10 is a simplified block diagram of a transmitter, in accordance with an exemplary embodiment of the present invention.

FIG. 10 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 11:
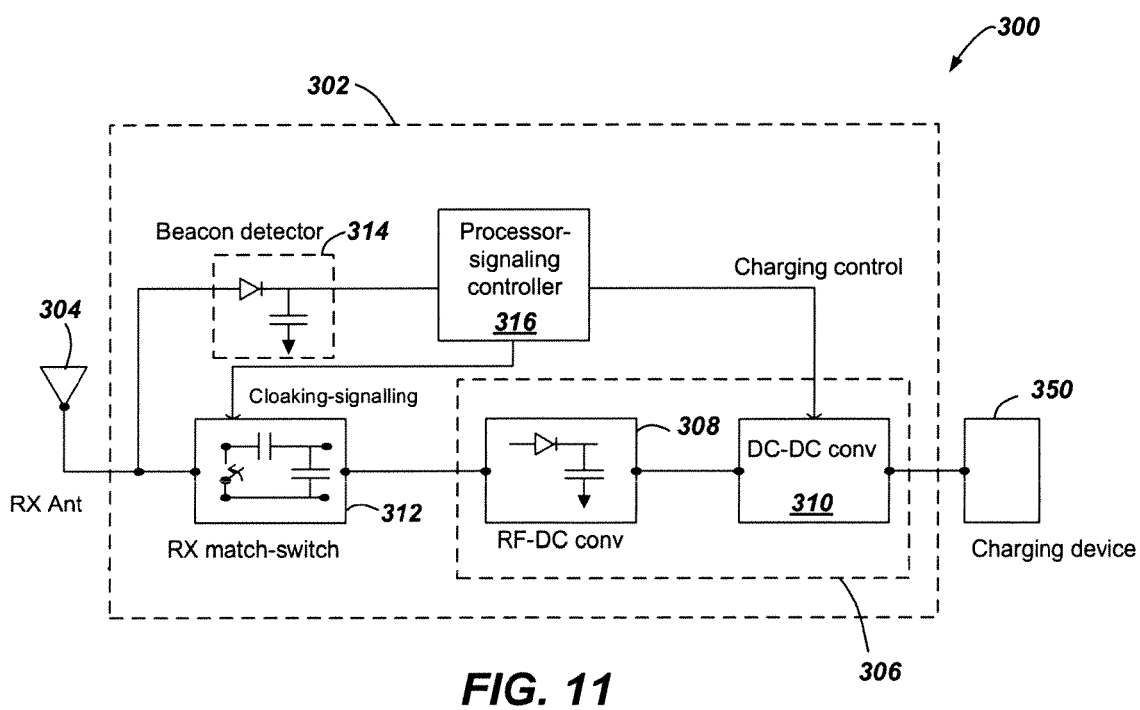
FIG. 11 is a simplified block diagram of a receiver, in accordance with an exemplary embodiment of the present invention.

FIG. 11 is a block diagram of a receiver, in accordance with an embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 10). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 12:
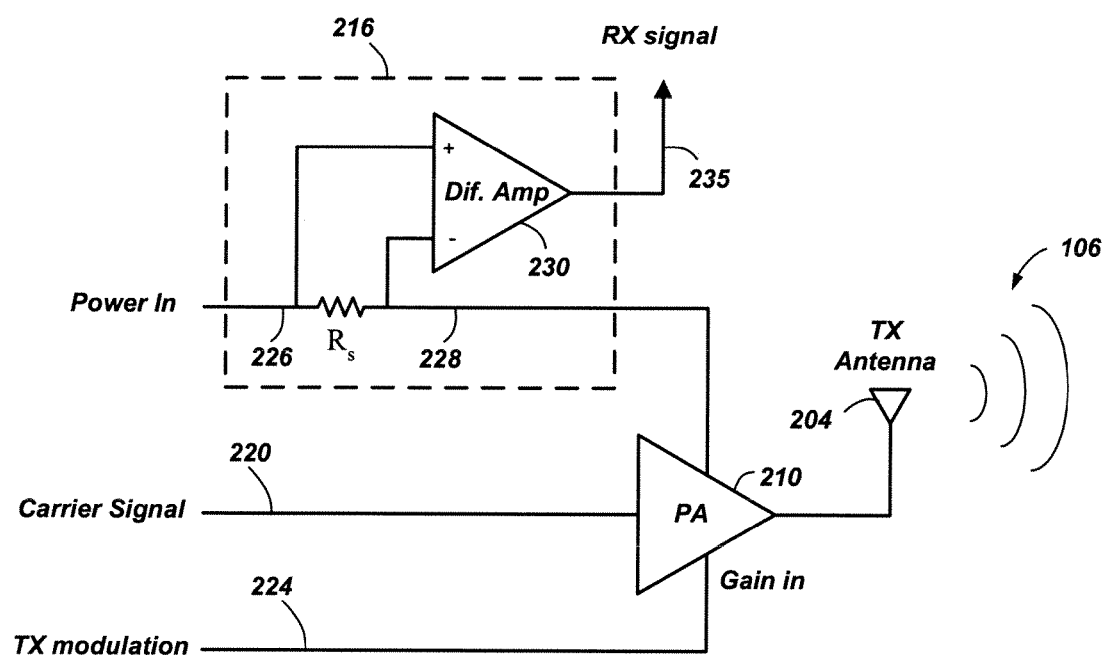
FIG. 12 shows a simplified schematic of a portion of transmit circuitry for carrying out messaging between a transmitter and a receiver.

FIG. 12 shows a simplified schematic of a portion of transmit circuitry for carrying out messaging between a transmitter and a receiver. In some exemplary embodiments of the present invention, a means for communication may be enabled between the transmitter and the receiver. In FIG. 12 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 12 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 12) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 13A:
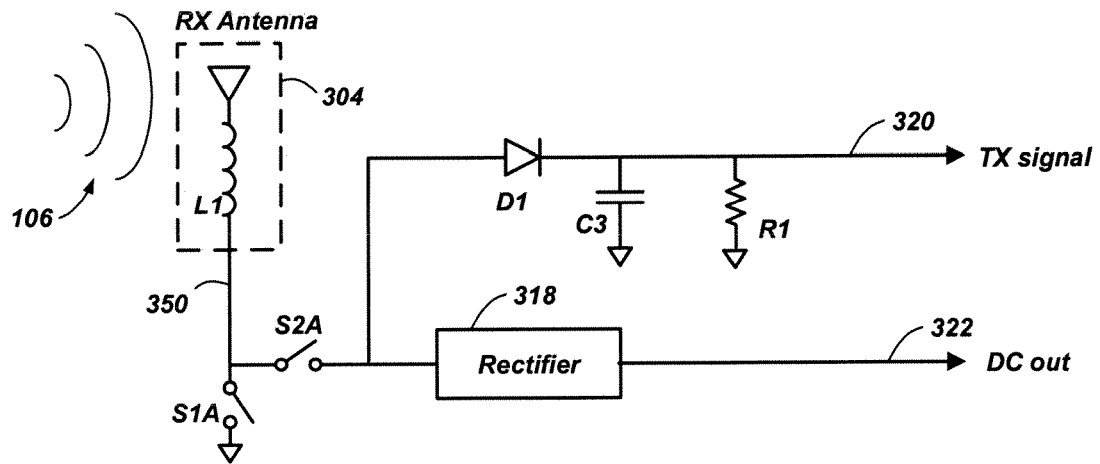
FIGS. 13A-13C shows a simplified schematic of a portion of receive circuitry in various states to illustrate messaging between a receiver and a transmitter.
Figure 13B:
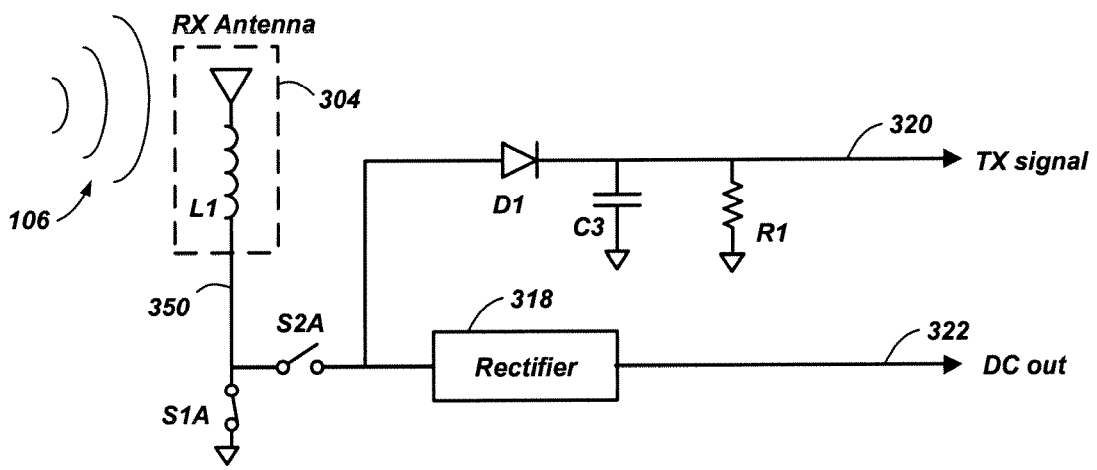
Figure 13C:
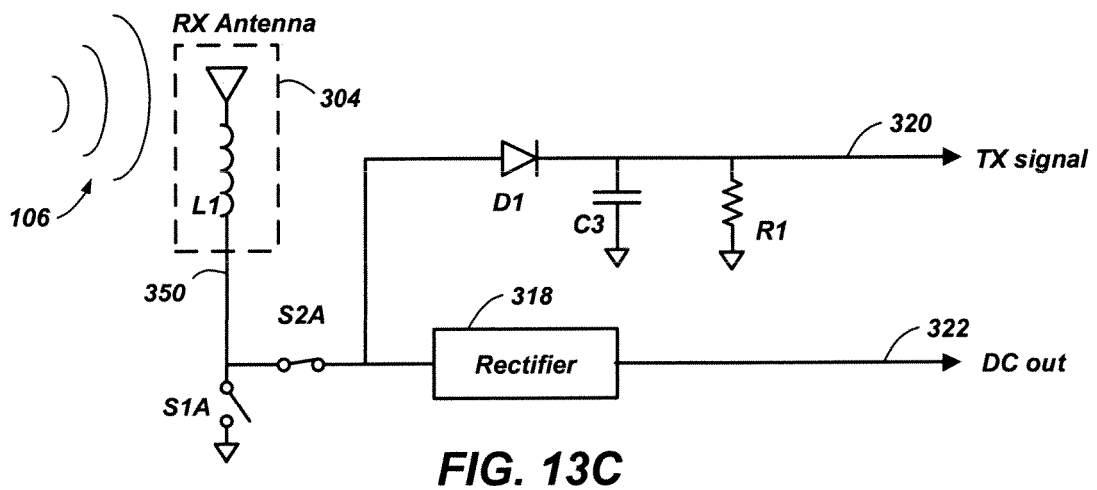

FIGS. 13A-13C shows a simplified schematic of a portion of receive circuitry in various states to illustrate messaging between a receiver and a transmitter. All of FIGS. 13A-13C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

Exemplary embodiments of the invention includes modulation of the receive device's current draw and modulation of the receive antenna's impedance to accomplish reverse link signaling. With reference to both FIG. 13A and FIG. 12, as the power draw of the receive device changes, the load sensing circuit 216 detects the resulting power changes on the transmit antenna and from these changes can generate the receive signal 235.

In the embodiments of FIGS. 13A-13C, the current draw through the transmitter can be changed by modifying the state of switches S1A and S2A. In FIG. 13A, switch S1A and switch S2A are both open creating a "DC open state" and essentially removing the load from the transmit antenna 204. This reduces the current seen by the transmitter.

In FIG. 13B, switch S1A is closed and switch S2A is open creating a "DC short state" for the receive antenna 304. Thus the state in FIG. 13B can be used to increase the current seen in the transmitter.

In FIG. 13C, switch S1A is open and switch S2A is closed creating a normal receive mode (also referred to herein as a "DC operating state") wherein power can be supplied by the DC out signal 322 and a transmit signal 320 can be detected. In the state shown in FIG. 13C the receiver receives a normal amount of power, thus consuming more or less power from the transmit antenna than the DC open state or the DC short state.

Reverse link signaling may be accomplished by switching between the DC operating state (FIG. 13C) and the DC short state (FIG. 13B). Reverse link signaling also may be accomplished by switching between the DC operating state (FIG. 13C) and the DC open state (FIG. 13A).

Figure 14A:
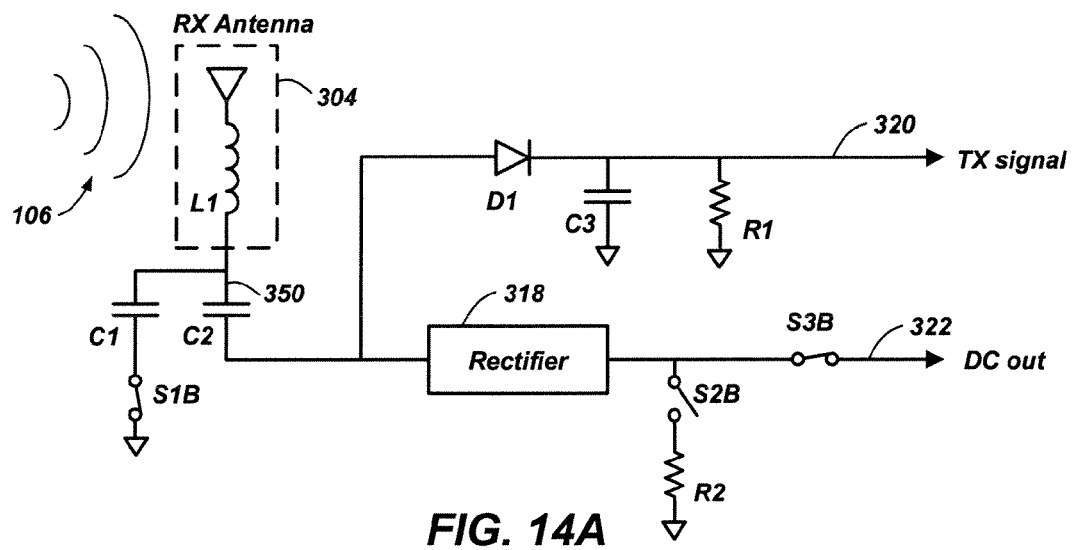
FIGS. 14A-14C shows a simplified schematic of a portion of alternative receive circuitry in various states to illustrate messaging between a receiver and a transmitter.
Figure 14B:
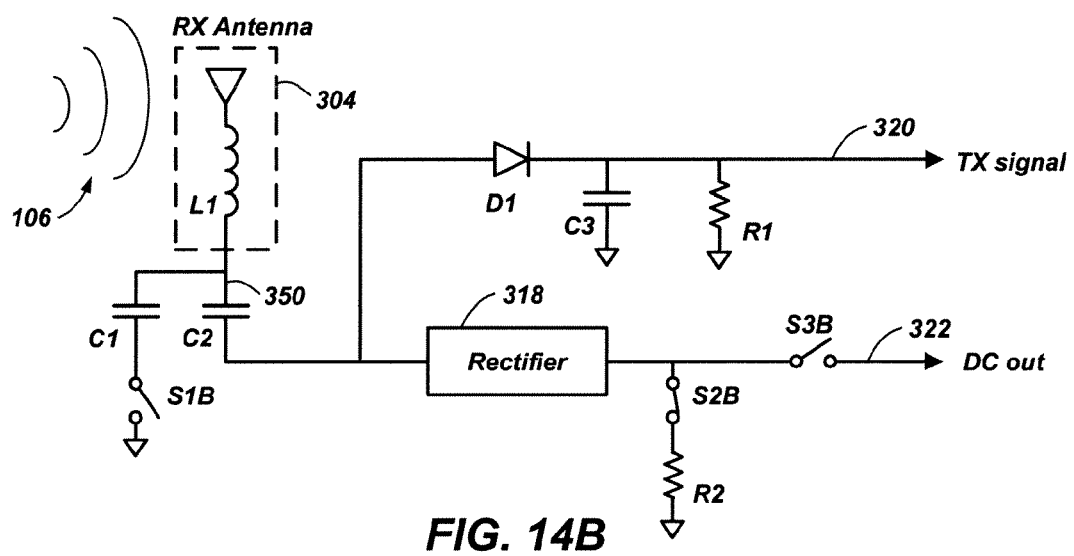
Figure 14C:
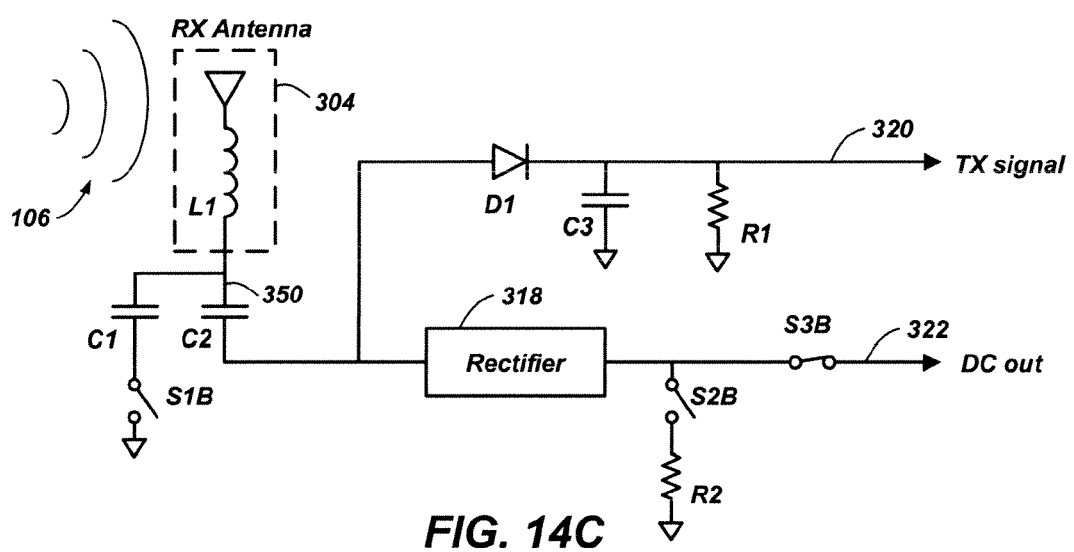

FIGS. 14A-14C shows a simplified schematic of a portion of alternative receive circuitry in various states to illustrate messaging between a receiver and a transmitter.

All of FIGS. 14A-14C show the same circuit elements with the difference being state of the various switches. A receive antenna 304 includes a characteristic inductance L1, which drives node 350. Node 350 is selectively coupled to ground through capacitor C1 and switch S1B. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 13A-13C the DC impedance of the receive antenna 304 is changed by selectively coupling the receive antenna to ground through switch S1B. In contrast, in the embodiments of FIGS. 14A-14C, the impedance of the antenna can be modified to generate the reverse link signaling by modifying the state of switches S1B, S2B, and S3B to change the AC impedance of the receive antenna 304. In FIGS. 14A-14C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 14A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 14B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 14C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 14C) and the AC cloaking state (FIG. 14A). Reverse link signaling also may be accomplished by switching between the tuned dummy-load state (FIG. 14B) and the AC cloaking state (FIG. 14A). Reverse link signaling also may be accomplished by switching between the tuned operating state (FIG. 14C) and the tuned dummy-load state (FIG. 14B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 14A-14C to create other possible combinations for cloaking, reverse link signaling, and supplying power to the receive device.

Thus, when in a coupled mode signals may be sent from the transmitter to the receiver, as discussed above with reference to FIG. 12. In addition, when in a coupled mode signals may be sent from the receiver to the transmitter, as discussed above with reference to FIGS. 13A-13C and 14A-14C.

Figure 15A:
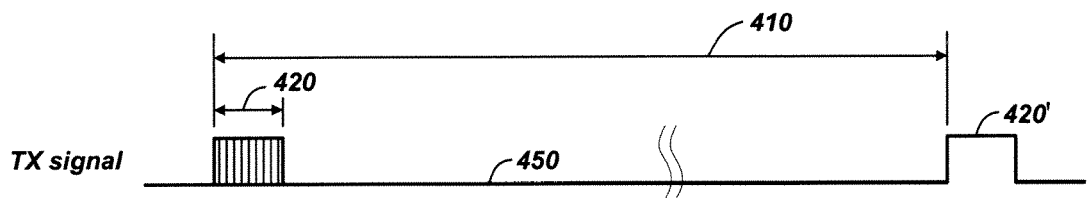
FIGS. 15A-15C are timing diagrams illustrating a messaging protocol for communication between a transmitter and a receiver.
Figure 15B:
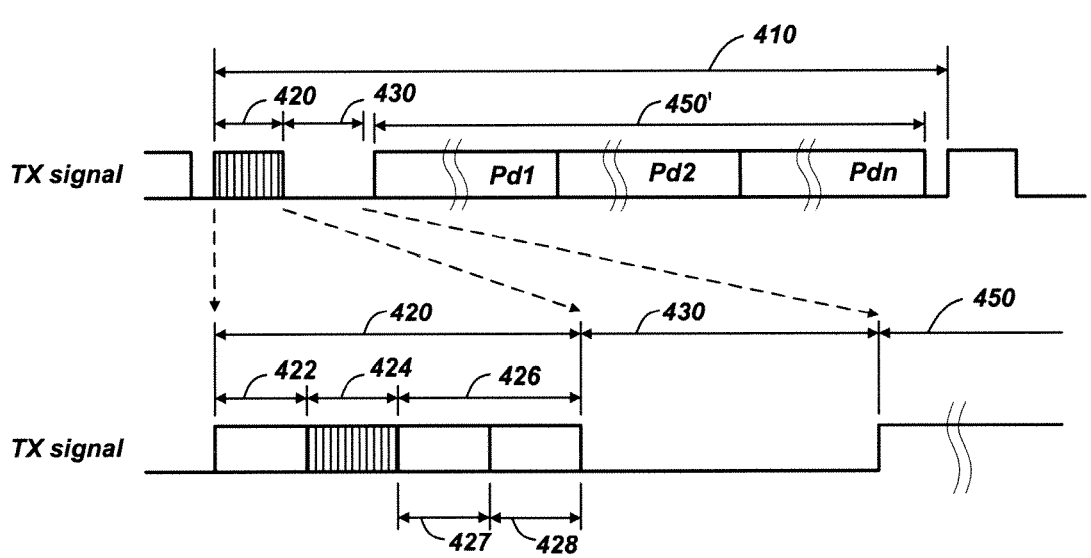
Figure 15C:
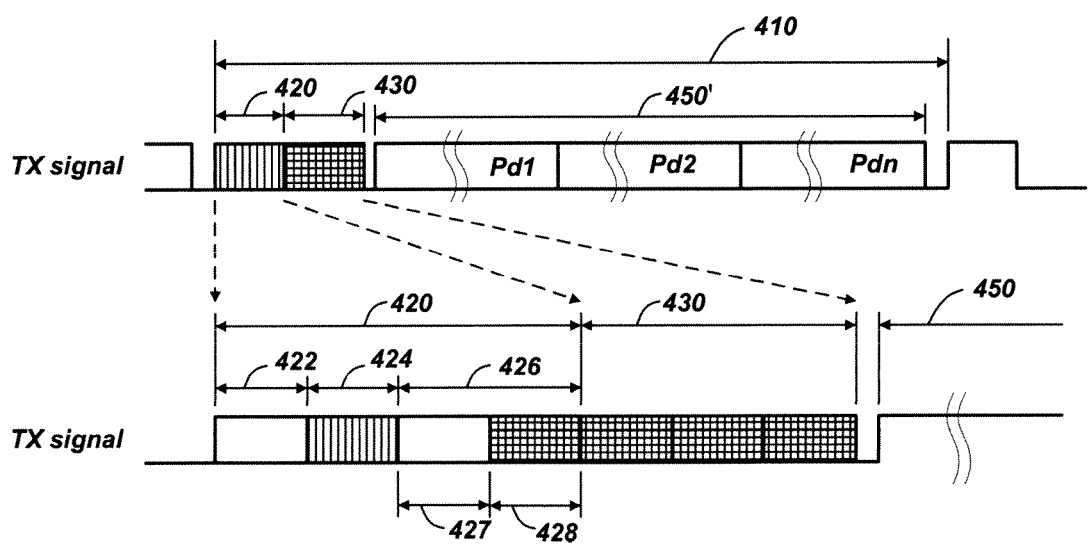

FIGS. 15A-15C are timing diagrams illustrating a messaging protocol for communication between a transmitter and a receiver using the signaling techniques discussed above. In one exemplary approach, signals from the transmitter to the receiver are referred to herein as a "forward link" and use a simple AM modulation between normal oscillation and no oscillation. Other modulation techniques are also contemplated. As a non-limiting example, a signal present may be interpreted as a 1 and no signal present may be interpreted as a 0.

Reverse link signaling is provided by modulation of power drawn by the receive device, which can be detected by the load sensing circuit in the transmitter. As a non-limiting example, higher power states may be interpreted as a 1 and lower power states may be interpreted as a 0. It should be noted that the transmitter must be on for the receiver to be able to perform the reverse link signaling. In addition, the receiver should not perform reverse link signaling during forward link signaling. Furthermore, if two receive devices attempt to perform reverse link signaling at the same time a collision may occur, which will make it difficult, if not impossible for the transmitter to decode a proper reverse link signal.

In the exemplary embodiment described herein, signaling is similar to a Universal Asynchronous Receive Transmit (UART) serial communication protocol with a start bit, a data byte, a parity bit and a stop bit. Of course, any serial communication protocol may be suitable for carrying the exemplary embodiment of the present invention described herein. For simplicity of description, and not as a limitation, the messaging protocol will be described such that the period for communicating each byte transmission is about 10 mS.

FIG. 15A illustrates the simplest, and lowest power form of the messaging protocol. A synchronization pulse 420 will be repeated every recurring period 410 (about one second in the exemplary embodiment). As a non-limiting example, the sync pulse on time may be about 40 mS. The recurring period 410 with at least a synchronization pulse 420 may be repeated indefinitely while the transmitter is on. Note that "synchronization pulse" is somewhat of a misnomer because the synchronization pulse 350 may be a steady frequency during the pulse period as illustrated by the "white" pulse 420'. The synchronization pulse 420 may also include signaling at the resonant frequency with the ON/OFF keying discussed above and as illustrated by the "hatched" pulse 420. FIG. 15A illustrates a minimal power state wherein power at the resonant frequency is supplied during the synchronization pulse 420 and the transmit antenna is off during a power period 450. All receive devices are allowed to receive power during the synchronization pulse 420.

FIG. 15B illustrates the recurring period 410 with a synchronization pulse 420, a reverse link period 430 and a power period 450' wherein the transmit antenna is on and supplying full power by oscillating at the resonant frequency and not performing any signaling. The upper timing diagram illustrates the entire recurring period 410 and the lower timing diagram illustrates an exploded view of the synchronization pulse 420 and the reverse link period 430. The power period 450' may be segmented into different periods for multiple receive devices as is explained below. FIG. 15B shows three power segments Pd1, Pd2, and Pdn for three different receive devices.

When forward link signaling occurs, the synchronization pulse 420 may include a warm-up period 422, a forward link period 424, and a listening period 426. The listening period 426 may include a handover period 427 and a beginning reverse link period 428. During the synchronization pulse 420, the transmitter may send out a forward link message during the forward link period 400 (indicated by the "hatched" section) and waits for a reply from a receiver during the listening period 426. In FIG. 15B, no receivers reply, which is indicated by the "white" sections during the listening period 426.

FIG. 15C is similar to FIG. 15B except that a receiver replies during the beginning reverse link period 428 and the reverse link period 430, as indicated by the "cross-hatched" sections. In FIG. 15, during the synchronization pulse 420, the transmitter sends out a forward link message during the forward link period 400 and waits for a reply from a receiver during the listening period 426. Any receivers that are going to reply begin their reply before the end of the handover period 427, during the beginning reverse link period 428, and possibly during the reverse link period 430.

As a non-limiting example, Table 2 shows some possible messages that may be sent by the transmitter and the receiver.

TABLE 2

| TX Command | TX message | RX Reply | RX message |
|---|---|---|---|
| Null | | | |
| NDQ (New Device Query) | | NDR (New Device Response) | DD TT PP rr cc |
| DQ (Device Query) | DD | DS (Device Status) | DD TT PP cc |
| ACK (Acknowledge a device XX from previous DS) | | | |
| SA (Slot Assignment) | DD NN MM cc | | |
| RES (Reset all power slot assignments) | | | |

Where:
Null = no transmit command;
DD = Device number;
TT = Device Type;
PP = Power requested;
rr = a random number;
cc = a checksum;
NN = start of time slot; and
MM = end of time slot In explaining table 1, the null command means that no messaging is sent by the transmitter during the forward link period 424. In line 2, a new device query (NDQ) is sent by the transmitter. If a receive device responds, it responds with a new device response (NDR) along with a device number (which should be zero for a new device, until the device number is assigned by the transmitter), a power request, a random number, and a checksum of all the data bits in the receive reply.

In line 3, a new device query (DQ) is sent by the transmitter along with a device number. The receive device that was addressed by the DQ replies with a device status (DS), along with the device number, the device type, the amount of power requested, and a checksum of all the data bits in the receive reply.

In line 4, the transmitter sends out an acknowledge (ACK) to the receiver that replied to the previous DQ. No receivers respond to an ACK In line 5, the transmitter sends out a slot assignment (SA) along with a device number, a start time within the power period 450', an end time within the power period 450', and a checksum of all the data bits in the receive reply. No receivers respond to an SA.

In line 6, the transmitter sends out a reset (RES) indicating that all receivers should stop using their allocated time slots. No receivers respond to an RES.

Of course, those of ordinary skill in the art will recognize that the commands and responses are exemplary and various embodiments contemplated within the scope of the present invention may use variations of these commands and responses, and additional commands and responses may be devised within the scope of the present invention.

To further illustrate how communication occurs, five different scenarios will be discussed. In the first scenario, initially no receive devices are within the coupling-mode region of the transmitter and one receive device enters the coupling-mode region. When no device are present in the coupling-mode region the transmitter will remain in the low power state as illustrated in FIG. 15A and repeat the synchronization pulse 420 every recurring period 410. The synchronization pulse 420 will include a NDQ during the forward link period 424 and the transmitter will listen for a reply during the listening period 426. If no reply is received, the transmitter shuts down until time for the synchronization pulse 420 of the next recurring period 410.

When a new receive device is introduced to the coupling-mode region, the receive device is initially on and listening for a synchronization pulse 420. The new receive device may use the synchronization pulse 420 for power but should go into a cloaked or non-power reception mode (referred to herein as "getting off the bus") during the power period 450'. In addition, the new receive device listens for transmit commands and ignores all transmit commands except an NDQ. When a new receive device receive an NDQ, it remains on during the handover period 427, the beginning reverse link period 428, and possibly the reverse link period 430. After the forward link period 424 and before the end of the handover period 427, the receive device responds with a NDR, a device ID of zero (a new device ID will be assigned by the transmitter), a power amount request, a random number and a checksum. The new receive device then gets off the bus during the power period 450'.

If the transmitter receives the NDR correctly, it responds on the next synchronization pulse 420 with a slot assignment (SA) for the new receive device. The SA includes a device ID for the new receive device, a start time, an end time, and a checksum. The start time and end time for this SA will be zero indicating that the new receive device should not get on the bus for any time period during the power period 450'. The new receive device will receive a subsequent SA with actual start times and end times assigning a specific power segment Pdn when it can get on the bus. If the new receive device does not receive a proper checksum, in remains in new device mode and responds again to an NDQ.

In the second scenario, no receive devices are within the coupling-mode region of the transmitter and more than one receive device enters the coupling-mode region. In this mode, when two new receive devices are introduced to the coupling-mode region they are initially on the bus all the time. The new receive devices may use the synchronization pulse 420 for power but should get off the bus during the power period 450' once a synchronization pulse 420 has been received. In addition, the new receive devices listen for transmit commands and ignore all transmit commands except an NDQ. When the new receive device receive an NDQ, they remain on during the handover period 427, the beginning reverse link period 428, and possibly the reverse link period 430. After the forward link period 424 and before the end of the handover period 427, the receive devices responds with a NDR, a device ID of zero (a new device ID will be assigned by the transmitter), a power amount request, a random number and a checksum.

However, since two or more receive devices are responding at the same time, and likely have different random numbers and checksums, the message received by the transmitter will be garbled, and the checksum in the transmitter will not be accurate. As a result, the transmitter will not send out a SA on the subsequent synchronization pulse 420.

When an immediate SA is not forthcoming after an NDR, each of the receive devices waits a random number of subsequent NDQs before responding with an NDR. For example, two devices both respond to the first NDQ so no subsequent SA happens. Device 1 decides to wait four NDQs before responding to another NDQ. Device 2 decides to wait two NDQs before responding to another NDQ. As a result, on the next NDQ sent out by the transmitter, neither device responds with an NDR. On the next NDQ sent out by the transmitter, only device 2 responds with an NDR, the transmitter successfully receives the NDR and sends out an SA for device 2. On the next NDQ, device 2 does not respond because it is no longer a new device and device 1 does not respond because its random waiting period has not elapsed. On the next NDQ sent out by the transmitter, only device 1 responds with an NDR, the transmitter successfully receives the NDR and sends out an SA for device 1.

In the third scenario, at least one receive device is in the coupling-mode region and a new receive device enters the coupling-mode region. In this mode, the new receive devices is introduced to the coupling-mode region and is initially on the bus all the time. The new receive devices may use the synchronization pulse 420 for power but should get off the bus during the power period 450' once a synchronization pulse 420 has been received. In addition, the new receive devices listen for transmit commands and ignore all transmit commands except an NDQ. Periodically, the transmitter will issue an NDQ to see if any new devices have entered the coupling-mode region. The new device will then reply with an NDR. On the subsequent synchronization pulse 420, the transmitter will issue an SA for the new device with no power slots assigned. The transmitter then recalculates power allocation for all the devices in the coupling-mode region and generates new SAs for each device so there are no overlapping power segments Pdn. After each device receives its new SA, it begins getting on the bus only during its new Pdn.

In the fourth scenario, normal power delivery operation continues with no receive device entering or leaving the coupling-mode region. During this scenario, the transmitter will periodically ping each device with a device query (DQ). The queried device responds with a device status (DS). If the DS indicates a different power request, the transmitter may reallocate power allocation to each of the devices in the coupling-mode region. The transmitter will also periodically issues an NDQ as was explained above for the third scenario.

In the fifth scenario, a device is removed from the coupling-mode region. This "removed" state may be that the device is physically removed from the coupling-mode region, the device is shut off, or the device cloaks itself, perhaps because it does not need any more power. As stated earlier, the transmitter periodically sends out a DQ for all the devices in the coupling-mode region. If two consecutive DQs to a specific device do not return a valid DS, the transmitter removes the device from its list of allocated devices and reallocates the power period 450' to the remaining devices. The transmitter will also assign the missing device a power allocation of zero time in case it is still receiving by is unable to transmit. If a device was erroneously removed from the power allocation, it may regain power allocation by responding to and NDQ with a proper NDR.

Table 3 illustrates a non-limiting sequence of commands and replies to illustrate how the communication protocol operates.

TABLE 3

| Command | Description | Reply | Description | Comments |
|---|---|---|---|---|
| DQ1 | Query Device 1 | DS 1 1 FF cc | Device 1 is type 1, wants max power | Cellphone with low battery |
| DQ2 | Query Device 2 | DS 2 1 84 cc | Device 2 is type 3, wants to reduce power time slot | PDA with almost charged battery |
| SA 2 84 FF | Slot assign device 2 | | | Reduce device 2's power slot (reduce first, then increase) |
| SA 1 00 83 | Slot assign device 1 | | | Increase device 1's power slot |
| NDQ | New device query | NDR 00 04 FF rr cc | New device found | Mouse with a low battery, max power |
| SA 3 00 00 | Slot assign device 3 | | | Immediate reply after NDQ means it is for new device. Device ID is 3. Initial power slot is 0. |
| SA 1 00 40 | Slot assign device 1 | | | Device 1 reassigned to ¼ power. |
| SA 2 41 80 | Slot assign device 2 | | | Device 2 reassigned to ¼ power. |
| SA 3 81 FF | Slot assign device 2 | | | Device 3 reassigned to ½ power. |
| NDQ | New device query | | | No reply so no new device found. |
| null | | | | |
| DQ1 | | | | |
| DQ2 | | | | |
| DQ3 | | | | |
| NDQ | | | | |

Note that the first slot assignment for the new device allocates no time slot. Each existing device is allocated a new non-overlapping time slot, then the new device is finally allocated a time slot for receiving power.

In an exemplary embodiment, a wireless charging devices may display a visible signal, such as, for example, a light to the user indicating that it has successfully entered the charging region and registered itself to the local transmitter. This will give the user positive feedback that a device is indeed prepared to charge.

In other exemplary embodiments of the present invention, the receiver and transmitter may comm In other exemplary embodiments of the present invention, the receiver and transmitter may communicate on a separate communication channel 119 (e.g., Bluetooth, zigbee, cellular, etc) as is shown in FIG. 2. With a separate communication channel, the recurring period need not include any communication periods and the entire time may be devoted to the power period 450'. The transmitter may still allocate time slots to each receive device (communicated over the separate communication channel) and each receive device only gets on the bus for its allocated power segment Pdn.

The time-multiplexed power allocations described above may be the most-efficient method for supplying power to multiple receive devices within a transmitter's coupling-mode region. However, other power allocation scenarios may be employed with other embodiments of the present invention.

Figure 16A:
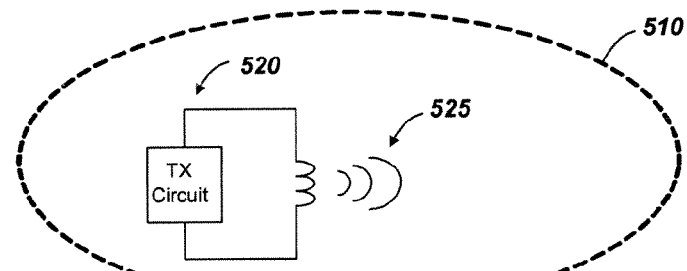
FIGS. 16A-16D are simplified block diagrams illustrating a beacon power mode for transmitting power between a transmitter and a receiver.

FIGS. 16A-16D are simplified block diagrams illustrating a beacon power mode for transmitting power between a transmitter and a one or more receivers. FIG. 16A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 16B:
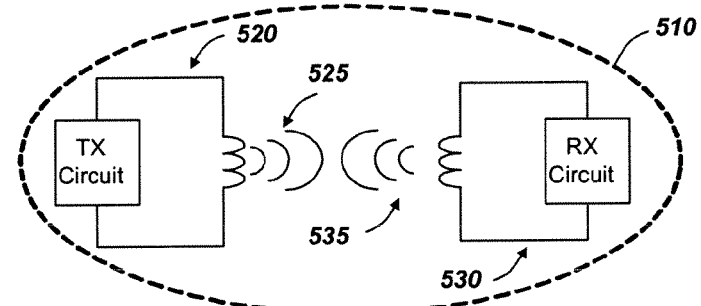

FIG. 16B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 12) of the transmitter. As a result, the transmitter may go into a high power mode.

Figure 16C:
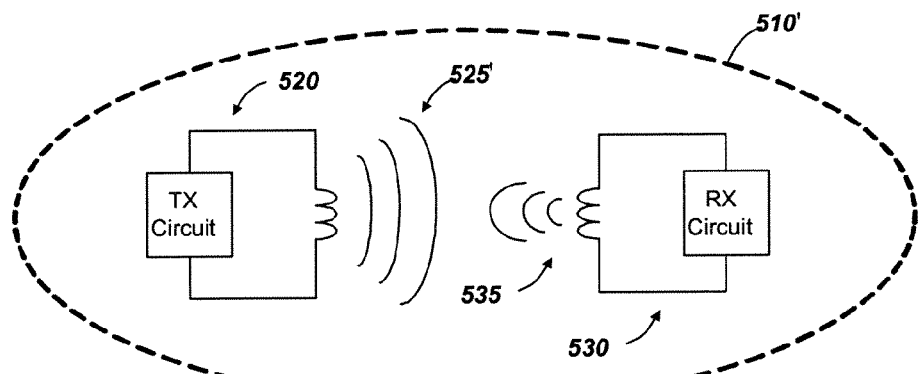

FIG. 16C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 8 and 9.

Figure 16D:
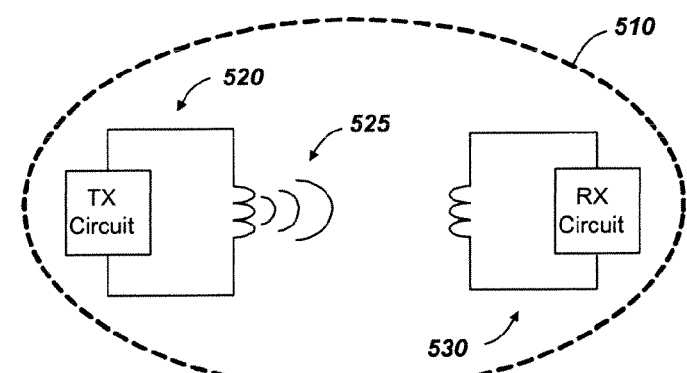

FIG. 16D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

As with the time-multiplexing mode, the receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Figure 17:
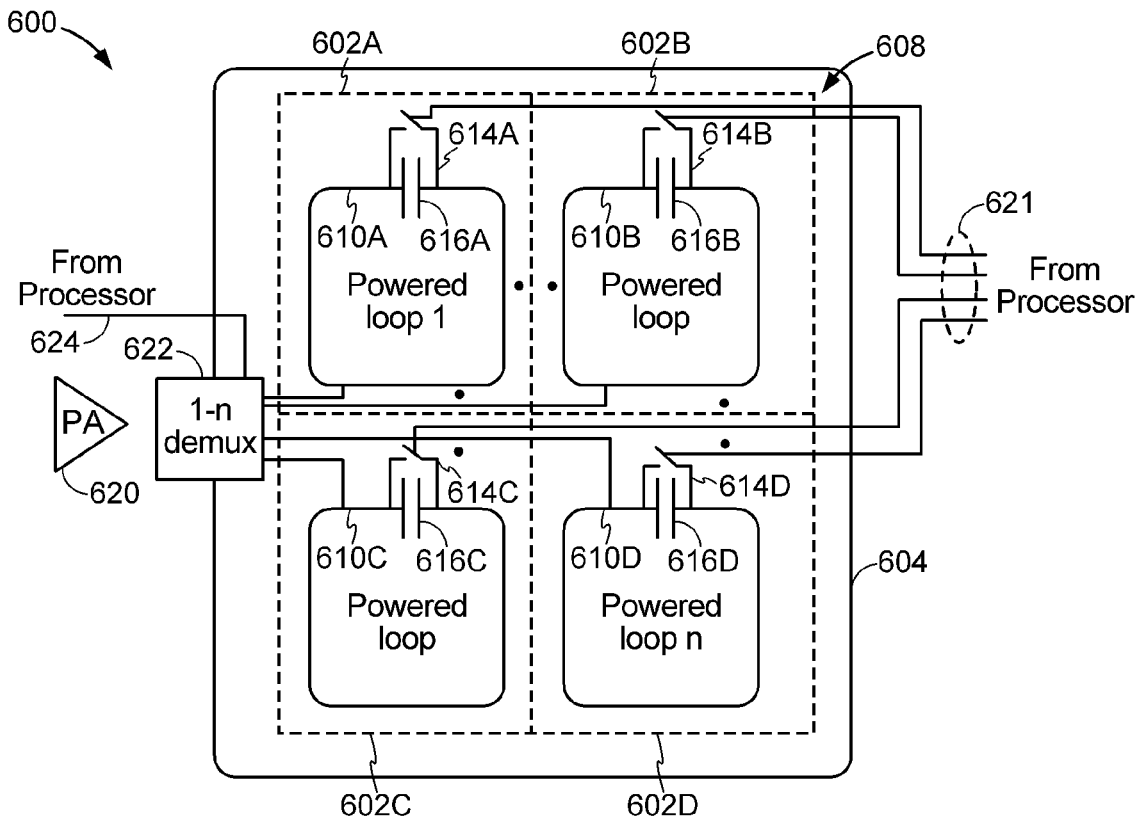
FIG. 17 is a simplified block diagram of an enlarged area wireless charging apparatus, in accordance with an embodiment of the present invention.
Figure 18:
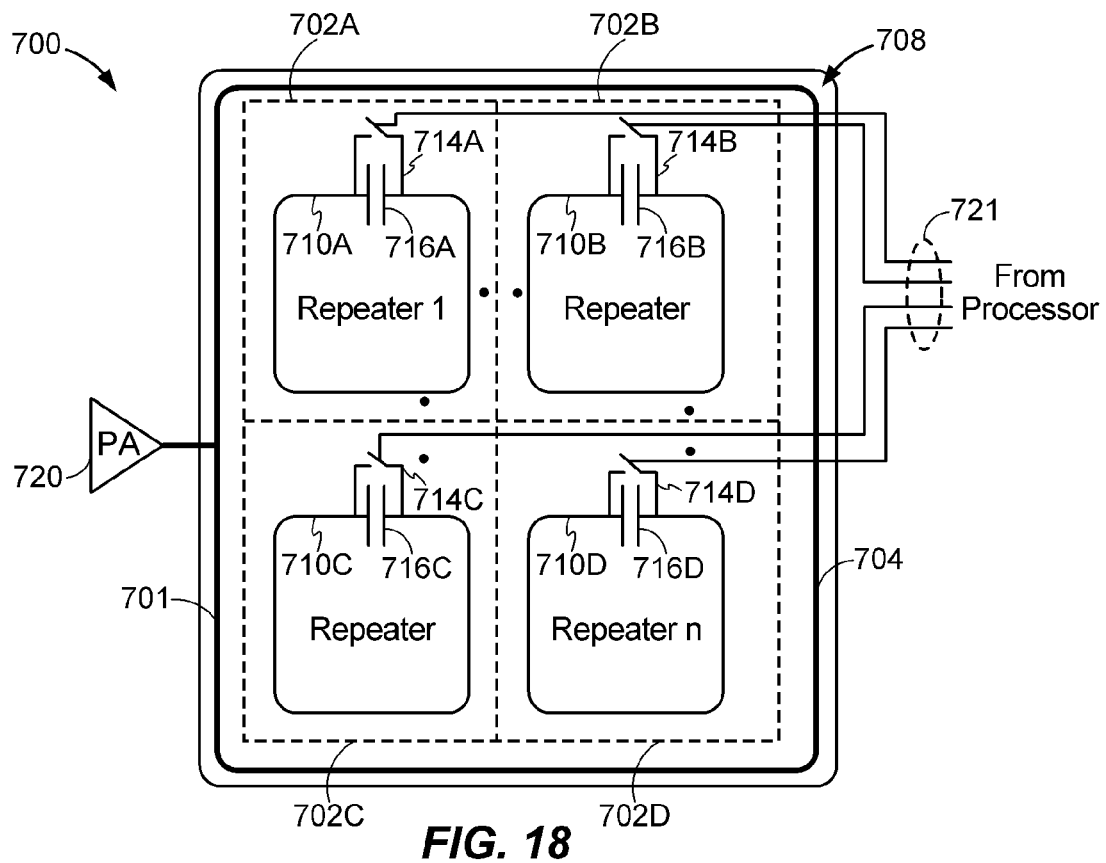
FIG. 18 is a simplified block diagram of an enlarged area wireless charging apparatus, in accordance with another embodiment of the present invention.

FIGS. 17 and 18 are plan views of block diagrams of an enlarged area wireless charging apparatus, in accordance with exemplary embodiments. As stated, locating a receiver in a near-field coupling mode region of a transmitter for engaging the receiver in wireless charging may be unduly burdensome by requiring accurate positioning of the receiver in the transmit antenna's near-field coupling mode region. Furthermore, locating a receiver in the near-field coupling mode region of a fixed-location transmit antenna may also be inaccessible by a user of a device coupled to the receiver especially when multiple receivers are respectively coupled to multiple user accessible devices (e.g., laptops, PDAs, wireless devices) where users need concurrent physical access to the devices. For example, a single transmit antenna exhibits a finite near-field coupling mode region. Accordingly, a user of a device charging through a receiver in the transmit antenna's near-field coupling mode region may require a considerable user access space that would be prohibitive or at least inconvenient for another user of another device to also wirelessly charge within the same transmit antenna's near-field coupling mode region and also require separate user access space. For example, two adjacent users of wireless chargeable devices seated at a conference table configured with a single transmit antenna may be inconvenienced or prohibited from accessing their respective devices due to the local nature of the transmitters near-field coupling mode region and the considerable user access space required to interact with the respective devices. Additionally, requiring a specific wireless charging device and its user to be specifically located may also inconvenience a user of the device.

Referring to FIG. 17, an exemplary embodiment of an enlarged area wireless charging apparatus 600 provides for placement of a plurality of adjacently located transmit antenna circuits 602A-602D to define an enlarged wireless charging area 608. By way of example and not limitation, a transmit antenna circuit includes a transmit antenna 610 having a diameter or side dimension, for example, of around 30-40 centimeters for providing uniform coupling to an receive antenna (not shown) that is associated with or fits in an electronic device (e.g., wireless device, handset, PDA, laptop, etc.). By considering the transmit antenna circuit 602 as a unit or cell of the enlarged area wireless charging apparatus 600, stacking or adjacently tiling these transmit antenna circuits 602A-602D next to each other on substantially a single planar surface 604 (e.g., on a table top) allows for increasing or enlarging the charging area. The enlarged wireless charging area 608 results in an increased charging region for one or more devices.

The enlarged area wireless charging apparatus 600 further includes a transmit power amplifier 620 for providing the driving signal to transmit antennas 610. In configurations where the near-field coupling mode region of one transmit antenna 610 interferes with the near-field coupling mode regions of other transmit antennas 610, the interfering adjacent transmit antennas 610 are "cloaked" to allow improved wireless charging efficiency of the activated transmit antenna 610. Alternatively, each loop 610A-610D may also include its own power amplifier.

The sequencing of activation of transmit antennas 610 in enlarged area wireless charging apparatus 600 may occur according to a time-domain based sequence. The output of transmit power amplifier 620 is coupled to a multiplexer 622 which time-multiplexes, according to control signal 624 from the transmitter processor, the output signal from the transmit power amplifier 620 to each of the transmit antennas 610.

In order to inhibit inducing resonance in adjacent inactive transmit antenna 610 when the power amplifier 620 is driving the active transmit antenna, the inactive antennas may be "cloaked" by altering the resonant frequency of that transmit antenna by, for example, activating the cloaking circuit 614. By way of implementation, concurrent operation of directly or nearly adjacent transmit antenna circuits 602 may result in interfering effects between concurrently activated and physically nearby or adjacent other transmit antenna circuits 602. Accordingly, transmit antenna circuit 602 may further include a transmitter cloaking circuit 614 for altering the resonant frequency of transmit antennas 610.

The transmitter cloaking circuit may be configured as a switching means (e.g. a switch) for shorting-out or altering the value of reactive elements, for example capacitor 616, of the transmit antenna 610. The switching means may be controlled by control signals 621 from the transmitter's processor. In operation, one of the transmit antennas 610 is activated and allowed to resonate while other of transmit antennas 610 are inhibited from resonating, and therefore inhibited from adjacently interfering with the activated transmit antenna 610. Accordingly, by shorting-out or altering the capacitance of a transmit antenna 610, the resonant frequency of transmit antenna 610 is altered to prevent resonant coupling from other transmit antennas 610. Other techniques for altering the resonant frequency are also contemplated.

In another exemplary embodiment, each of the transmit antenna circuits 602 can determine the presence or absence of receivers within their respective near-field coupling mode regions with the transmitter processor choosing to activate ones of the transmit antenna circuits 602 when receivers are present and ready for wireless charging or forego activating ones of the transmit antenna circuits 602 when receivers are not present or not ready for wireless charging in the respective near-field coupling mode regions. The detection of present or ready receivers may occur according to the receiver detection signaling protocol described herein or may occur according to physical sensing of receivers such as motion sensing, pressure sensing, image sensing or other sensing techniques for determining the presence of a receiver within a transmit antenna's near-field coupling mode region. Furthermore, preferential activation of one or more transmit antenna circuits by providing an enhanced proportional duty cycle to at least one of the plurality of antenna circuits is also contemplated to be within the scope of the present invention.

Referring to FIG. 18, an exemplary embodiment of an enlarged area wireless charging apparatus 700 provides for placement of a plurality of adjacently located repeater antenna circuits 702A-702D inside of a transmit antenna 701 defining an enlarged wireless charging area 708. Transmit antenna 701, when driven by transmit power amplifier 720, induces resonant coupling to each of the repeater antennas 710A-710D. By way of example and not limitation, a repeater antenna 710 having a diameter or side dimension, for example, of around 30-40 centimeters provides uniform coupling to a receive antenna (not shown) that is associated with or affixed to an electronic device. By considering the repeater antenna circuit 702 as a unit or cell of the enlarged area wireless charging apparatus 700, stacking or adjacently tiling these repeater antenna circuits 702A-702D next to each other on substantially a single planar surface 704 (e.g., on a table top) allows for increasing or enlarging the charging area. The enlarged wireless charging area 708 results in an increased charging space for one or more devices.

The enlarged area wireless charging apparatus 700 includes transmit power amplifier 720 for providing the driving signal to transmit antenna 701. In configurations where the near-field coupling mode region of one repeater antenna 710 interferes with the near-field coupling mode regions of other repeater antennas 710, the interfering adjacent repeater antennas 710 are "cloaked" to allow improved wireless charging efficiency of the activated repeater antenna 710.

The sequencing of activation of repeater antennas 710 in enlarged area wireless charging apparatus 700 may occur according to a time-domain based sequence. The output of transmit power amplifier 720 is generally constantly coupled (except during receiver signaling as described herein) to transmit antenna 701. In the present exemplary embodiment, the repeater antennas 710 are time-multiplexed according to control signals 721 from the transmitter processor. By way of implementation, concurrent operation of directly or nearly adjacent repeater antenna circuits 702 may result in interfering effects between concurrently activated and physically nearby or adjacent other repeater antennas circuits 702. Accordingly, repeater antenna circuit 702 my further include a repeater cloaking circuit 714 for altering the resonant frequency of repeater antennas 710.

The repeater cloaking circuit may be configured as a switching means (e.g. a switch) for shorting-out or altering the value of reactive elements, for example capacitor 716, of the repeater antenna 710. The switching means may be controlled by control signals 721 from the transmitter's processor. In operation, one of the repeater antennas 710 is activated and allowed to resonate while other of repeater antennas 710 are inhibited from resonating, and therefore adjacently interfering with the activated repeater antenna 710. Accordingly, by shorting-out or altering the capacitance of a repeater antenna 710, the resonant frequency of repeater antenna 710 is altered to prevent resonant coupling from other repeater antennas 710. Other techniques for altering the resonant frequency are also contemplated.

In another exemplary embodiment, each of the repeater antenna circuits 702 can determine the presence or absence of receivers within their respective near-field coupling mode regions with the transmitter processor choosing to activate ones of the repeater antenna circuits 702 when receivers are present and ready for wireless charging or forego activating ones of the repeater antenna circuits 702 when receivers are not present or not ready for wireless charging in the respective near-field coupling mode regions. The detection of present or ready receivers may occur according to the receiver detection signaling protocol described herein or may occur according to physical sensing of receivers such as motion sensing, pressure sensing, image sensing or other sensing techniques for determining a receiver to be within a repeater antenna's near-field coupling mode region.

The various exemplary embodiments of the enlarged area wireless charging apparatus 600 and 700 may further include time domain multiplexing of the input signal being coupled to transmit/repeater antennas 610, 710 based upon asymmetrically allocating activation time slots to the transmit/repeater antennas based upon factors such as priority charging of certain receivers, varying quantities of receivers in different antennas' near-field coupling mode regions, power requirements of specific devices coupled to the receivers as well as other factors.

Figure 19:
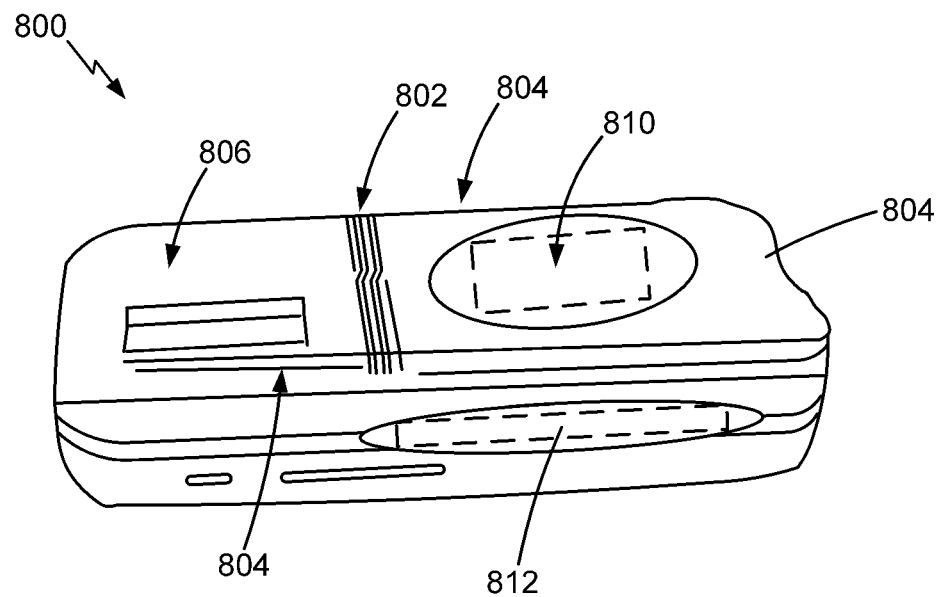
FIG. 19 is a perspective view of an electronic device including a wireless charging antenna, in accordance with an embodiment of the present invention.
Figure 20:
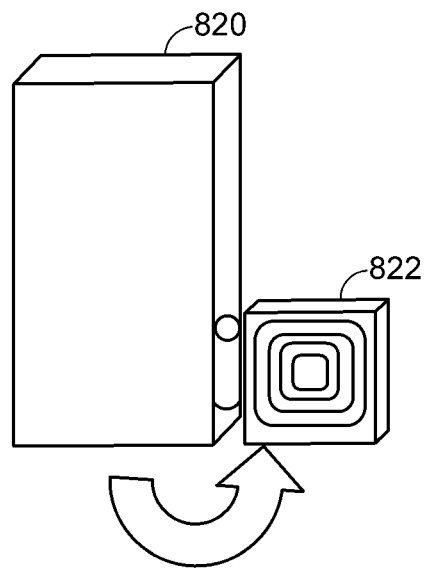
FIG. 20 is a perspective view of an electronic device including a wireless charging antenna, in accordance with another embodiment of the present invention.

FIGS. 19 and 20 illustrate wireless charging receive antennas, in accordance with exemplary embodiments. In order to provide wireless charging from a transmitter, the devices must include or have associated therewith a wireless charging antenna. FIG. 19 illustrates a wireless charging receive antenna 802 formed about a device 800, in accordance with one exemplary embodiment. FIG. 20 illustrates another wireless charging receive antenna 822 attached to a device 820 as an appendage, in accordance with another exemplary embodiment.

Regarding a physical embodiment of a receive antenna 802, 822, each of the wireless charging devices 800, 820 include a receiver circuit coupled to a receive antenna 802, 822. Exemplary embodiments of a receive antenna 802, 822 address integration of small antennas with smaller dimensioned devices 800, 820 such as a wireless handset, PDA, computer or other portable electronic device. The available area for additional circuitry in these devices is very limited and makes integrating a traditional antenna into these devices largely impractical due to inefficient energy transfer. Exemplary embodiments of the invention include embedding a multi-turn loop receive antenna 802 (FIG. 19), for example, over the edge of, for example, a non-metallic (e.g., plastic) housing 806 of the device 800 or attaching a multi-turn loop receive antenna 822 (FIG. 20) to a housing appendage, for example, from device 820. Accordingly, the receive antenna 802, 822 can coexist with an internal circuit board (not shown) of the device 800, 820 while not requiring much area (e.g., nominal additional wireless power transfer circuitry) from the internal circuitry of the device 800, 820.

As illustrated in FIG. 19, an exemplary embodiment of a multi-turn loop receive antenna is embedded, for example, on a cover or housing 806 of the device 800. The multi-turn loop receive antenna 802 may be a printed antenna applied to an exterior or interior surface of housing 806. Furthermore, the multi-turn loop receive antenna 802 may circumscribe a substantial portion of a majority surface of housing 806 in order to expand the diameter of the loop antenna as much as possible to enhance resonant coupling with the transmit antenna having a generally larger diameter. In an exemplary embodiment, the multi-turn receive antenna 802 is located on the edges 804 of housing 806 hugging the device's internal circuitry. In an exemplary embodiment, the multi-turn receive antenna 802 is integrated near the edges 804, for example, of the plastic housing 806 of the device 800 and exhibits a higher efficiency than smaller compact multi-turn loop antennas placed over the internal circuit board (shown in cut-out as 812) or the area of the battery (shown in cut-out as 810).

It is known that electrically small antennas have low efficiency, often no more than a few percent as explained by the theory of small antennas, known by those of skill in the art. Generally, the smaller the electric size of an antenna, the lower is its efficiency. Accordingly, wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters, for example, can be deemed a suitable range for most applications. Generally, this range reduces the effective frequency for the electric power in the interval, for example, between 5 MHz to 100 MHz.

As stated for wireless charging, transmit and receive antennas are coupled to each other in the near-field coupling mode region so that the current distribution is different from implementations where antennas individually radiate to the far field, so that the redistribution of current in coupled antennas reduces the power loss caused by lossy conductors that comprise the transmit and receive antennas.

The available circuitry area in typical small devices such as wireless handsets, PDAs, etc., is so scarce that even integration of a small antenna within a handheld device is difficult.

Furthermore, since most suitable receive antennas for wireless power transfer to small devices are some form of a loop, it is appreciated that loops close to and parallel with a conducting plate (such as an internal circuit board or the battery) do not function efficiently. Therefore, even if enough circuitry area in a device could be devoted to an internal wireless charging receive antenna on the internal circuit board, inefficient power transfer could still result in less than desirable power transfer. While there have been attempts in a related RF Identification (RFID) technology field to use a layer of high permeability material (such as ferrite) between a receive antenna and the internal circuit board or the battery to reduce the effect of presence of the conductor on the antenna, the loss due to inefficient wireless power transfer as a result of losses from the ferrite material are often unacceptable.

Therefore, in one exemplary embodiment, a multi-turn loop antenna 802 is used for handheld devices 800, where the multi-turn loop wireless charging receive antenna 802 is integrated into or over the edge 804 of, for example, the plastic cover or housing 806 of the device 800 as shown in FIG. 19. In an exemplary embodiment, a device 800 includes a wireless charging receive antenna 802 which includes a plurality of loops, for example five loops as illustrated for receive antenna 802, located near the outer edge 804 of the device 800. By placing the receive antenna 802 external to the general internal locations of the internal circuit board (not shown), the deleterious affects of ground planes and other interfering circuits can be marginalized.

Furthermore, the generally larger external circumference of the housing 806 results in an increased loop diameter than could be obtained using an internal and more compact multi-turn loop antenna within the device 800 or on the battery 810. Accordingly, a larger effective loop results in a smaller resonant capacitor than would be needed for an internal receive antenna implementation for bringing a multi-turn loop receive antenna into resonance at the desired frequency. Furthermore, smaller capacitors of certain technologies usually have higher Q values (i.e., a lower rate of energy dissipation relative to the oscillation frequency, so the oscillations die out more slowly) and help improve coupling efficiency for the wireless power transfer.

Furthermore, in the exemplary embodiments, the receive antenna 802, 822 provides improved levels of coupling between the wireless charging transmit antenna and the wireless charging device receive antenna 802, 822, indicating that the antennas exhibit a higher efficiency. Also, the "antenna function" or its efficiency is less affected by the presence of the internal circuit board (not shown) in the device 800, 822, unlike more compact multi-loop internal antennas located on the internal circuit board or on the back of the battery. The exemplary embodiment also reduces the need for requiring internally dedicated area within the device 800, 820.

As describe above, FIG. 4 illustrates exemplary simulation results for the coupling between the transmit antenna and the multi-turn receive antenna 802 embedded in a device 800. Coupling occurs at the known RFID frequency (e.g., 13.56 MHz) in the exemplary simulation at approximately −0.9 dB. Measured coupling for the above prototype is about −2.4 dB. The difference is mainly due to real capacitors used in the measurement as opposed to ideal capacitors (infinite Q) that are assumed in the simulations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charging receiver, comprising:
a first loop antenna having an energy receiving conductor and configured to resonate at a wireless charging frequency, the first loop antenna configured to transfer wirelessly received power to an electronic device, the first loop antenna being formed on or embedded in a housing of the electronic device, the first loop antenna comprising a first portion located on a first plane and a second portion extending from the first portion and located on a second plane different from the first plane; and
a second loop antenna having an energy receiving conductor electrically coupled to the first loop antenna to form a multi-loop antenna.

2. The receiver of claim 1, wherein the multi-loop antenna surrounds a majority portion of the housing.

3. The receiver of claim 1, wherein the multi-loop antenna occupies a space external to an electronic circuit of the electronic device.

4. The receiver of claim 1, wherein the multi-loop antenna comprises a multi-turn printed antenna integrated with the housing.

5. The receiver of claim 4, wherein the multi-turn printed antenna is integrated with a surface of the housing, and wherein the multi-turn printed antenna surrounds a majority portion of the surface.

6. The receiver of claim 1, wherein the multi-loop antenna comprises reactive components a portion of which is configured to switchably vary.

7. The receiver of claim 1, wherein the first loop antenna further comprises a third portion extending from the first portion and located on a third plane different from the first plane.

8. An apparatus, comprising:
an electronic circuit in a housing of a device configured to perform an electronic function of the device; and
a wireless charging receiver coupled to the electronic circuit and configured to transfer wirelessly received power to the electronic circuit, the wireless charging receiver including:
a first loop antenna having an energy receiving conductor and configured to resonate at a wireless charging frequency, the first loop antenna being formed on or embedded in the housing of the device, the first loop antenna comprising a first portion located on a first plane and a second portion extending from the first portion and located on a second plane different from the first plane; and
a second loop antenna having an energy receiving conductor electrically coupled to the first loop antenna to form a multi-loop antenna.

9. The apparatus of claim 8, wherein the number of turns of the multi-turn loop antenna is determined based on the diameter of the first loop antenna.

10. The apparatus of claim 8, wherein the multi-loop antenna surrounds a majority portion of the housing.

11. The apparatus of claim 8, wherein the multi-loop antenna occupies a space external to the electronic circuit of the device.

12. The apparatus of claim 8, wherein the multi-loop antenna comprises a multi-turn printed antenna.

13. The apparatus of claim 12, wherein the multi-turn printed antenna is formed on a surface of the housing and surrounds a majority portion of the surface.

14. The apparatus of claim 8, wherein the multi-loop antenna comprises reactive components a portion of which is configured to switchably vary.

15. The apparatus of claim 8, wherein the first loop antenna further comprises a third portion extending from the first portion and located on a third plane different from the first plane.

16. A wireless device, comprising:
a housing;
an electronic circuit enclosed within the housing; and
wireless charging circuitry configured to transfer power to the electronic circuit, the wireless charging circuitry comprising:
a multi-turn loop antenna configured to resonate in a charging region of a resonating transmitter and to receive power therefrom, the multi-turn loop antenna formed on or embedded in the housing, the multi-turn loop antenna comprising a first portion located on a first plane and a second portion extending from the first portion and located on a second plane different from the first plane.

17. The wireless device of claim 16, wherein the multi-turn loop antenna surrounds a majority portion of the housing.

18. The wireless device of claim 16, wherein the multi-turn loop antenna is embedded into an external surface of the housing.

19. The wireless device of claim 16, wherein the multi-turn loop antenna further comprises a third portion extending from the first portion and located on a third plane different from the first plane.

20. A method of receiving power via a wireless field, the method comprising:
resonating a first loop antenna having an energy receiving conductor at a wireless charging frequency, the first loop antenna configured to receive power via the wireless field; and
transferring the received power to an electronic device, the first loop antenna being formed on or embedded in a housing of the electronic device, the first loop antenna comprising a first portion located on a first plane and a second portion extending from the first portion and located on a second plane different from the first plane, the first loop antenna and a second loop antenna configured to form a multi-loop antenna, the second loop antenna having an energy receiving conductor electrically coupled to the first loop antenna.

21. The method of claim 20, wherein the first loop antenna further comprises a third portion extending from the first portion and located on a third plane different from the first plane.

22. An apparatus for receiving power via a wireless field, the apparatus comprising:

first means for resonating at a wireless charging frequency, the first resonating means having an energy receiving conductor and being configured to receive power via the wireless field, the first resonating means comprising a first portion located on a first plane and a second portion extending from the first portion and located on a second plane different from the first plane;

means for transferring the received power to an electronic device, the first resonating means being formed on or embedded in a housing of the electronic device; and second means for resonating having an energy receiving conductor electrically coupled to the first resonating means to form a multi-loop antenna.

23. The apparatus of claim 22, wherein the first resonating means further comprises a third portion extending from the first portion and located on a third plane different from the first plane.

* * * * *